US012669984B1

(12) United States Patent
Saimani et al.

(10) Patent No.: US 12,669,984 B1
(45) Date of Patent: Jun. 30, 2026

(54) TECHNIQUES FOR DATA-DRIVEN COMPUTATION TO ENABLE THE AUTOMATIC GENERATION OF DATA-DRIVEN INSIGHTS IN RESPONSE TO NATURAL LANGUAGE QUERIES

(71) Applicant: Intuit Inc., Mountain View, CA (US)

(72) Inventors: Jayanth Saimani, Bangalore (IN); Vignesh Thirukazhukundram Subrahma, Bangalore (IN); Suvrajit Manna, Bangalore (IN); Shrutendra Harsola, Bangalore (IN); Khushboo Gupta, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/432,024

(22) Filed: Dec. 23, 2025

(51) Int. Cl.
G06F 8/35 (2018.01)

(52) U.S. Cl.
CPC ..................................... G06F 8/35 (2013.01)

(58) Field of Classification Search
None
See application file for complete search history.

(56) References Cited

U.S. PATENT DOCUMENTS

| | | | | |
|---|---|---|---|---|
| 10,943,072 B1 * | 3/2021 | Jaganmohan | ........... | G06F 40/30 |
| 2019/0129695 A1 * | 5/2019 | Malur Srinivasan | ... | G10L 15/26 |

| | | | | |
|---|---|---|---|---|
| 2020/0274969 A1 * | 8/2020 | Dunn | .................... | G06F 40/205 |
| 2024/0354321 A1 * | 10/2024 | Kundel | ............... | G06F 16/3344 |
| 2025/0131632 A1 * | 4/2025 | Desin | .................... | A63F 13/655 |
| 2025/0355631 A1 * | 11/2025 | O'Hara | ...................... | G06F 8/30 |
| 2025/0390490 A1 * | 12/2025 | Chan | ................. | G06F 16/24522 |
| 2026/0044667 A1 * | 2/2026 | Mathur | ................. | G06F 40/166 |

FOREIGN PATENT DOCUMENTS

| | | | | | |
|---|---|---|---|---|---|
| CN | 118210489 A | * | 6/2024 | ............. | G06N 5/041 |
| CN | 120295609 A | * | 7/2025 | ........... | G06F 18/214 |

* cited by examiner

*Primary Examiner* — Philip Wang
*Assistant Examiner* — Rongfa P Wang
(74) *Attorney, Agent, or Firm* — Dinsmore & Shohl LLP

(57) ABSTRACT

Certain aspects of the disclosure provide techniques for code generation and execution for data-driven computation. A method generally includes obtaining: structured data associated with a query; and a plan that defines an analysis sequence for generation of data-driven output that is responsive to the query, wherein the analysis sequence comprises a plurality of steps based on the structured data; generating, based on the plan, prompt(s), each respective prompt comprising at least: instructions for generating a set of executable code configured to perform computation(s) in accordance with one or more of the steps; and a data profile for the structured data; prompting a language model (LM), with each respective prompt, to generate each set of executable code based on at least the data profile; executing each set of executable code to produce computed result(s); and generating data-driven output based on at least one computed result.

20 Claims, 15 Drawing Sheets

| Datasets | |
|---|---|
| 1 | Profit and Loss | This dataset represents Profit and Loss report in QBO to analyse company's profitability data. It can be used to split by different dimensions for better and in-depth analysis. |
| 2 | Project Status | This dataset represents Project Status report in QBO. Use this to track and analyze project information including project names, status, completion rates, etc. |
| 3 | Sales | This dataset represents only Sales Report in QBO. You can use this dataset to get data for sales. |
| 4 | Balance Sheet | This dataset represents Balance Sheet report in QBO. It provides a snapshot of a company's financial position, including assets, current_assets, bank_accounts, etc. |
| 5 | Inventory Valuation | This dataset represents only Inventory Valuation Report in QBO. You can use this dataset to get data for purchasing, pricing, and inventory management. |
| 6 | Transaction List | This report is a fundamental and versatile dataset that provides a comprehensive, chronological listing of all your business transactions within a specified period. |
| 7 | Purchase | This dataset represents only Purchase Report in QBO. You can use this dataset to get data for purchase. |
| 8 | A/P Aging Summary Report | This dataset represents A/P Aging Summary Report in QBO. You can use this dataset to get data for A/P Open Balances for different Aging Buckets grouped by vendor. |
| 9 | A/P Aging Detail Report | This dataset represents A/P Aging Detail Report in QBO. You can use this dataset to get detailed level data for A/P Open Balances, Amount, transactions types, etc. |
| 10 | Unpaid Bills | This dataset represents Unpaid Bills Report in QBO. You can use this dataset to get detailed level data for unpaid bills for A/P Open Balances, Amount, transactions type, etc. |
| 11 | A/R Aging Summary Report | This dataset represents A/R Aging Summary Report in QBO. Use this to get data for A/R open balances for different aging buckets grouped by customers. |
| 12 | A/R Aging Detail Report | This dataset represents A/R Aging Detail Report in QBO. Use this to get detailed data for A/R open balances, transaction types, due dates grouped by aging buckets. |

| 13 | Open Invoices | This dataset represents Open Invoices Report in QBO. Use this to get data for all open (unpaid) invoices, including amounts due and due dates. This is a aging report. |
| 14 | Customer Detail | This dataset represents Customer Detail Report in QBO. Use this to get detailed information about customers contact including contact information. |
| 15 | Vendor Detail | This dataset represents Vendor Detail Report in QBO. Use this to get detailed information about vendors including contact information and vendor-specific data |
| 16 | Deposit | This dataset represents Deposit Report in QBO. Use this to get data for all deposits. Suitable for questions about deposit tracking and cash management. |
| 17 | Check Detail Report | This dataset represents Check Detail Report in QBO. Use this to get detailed information about all check transactions including check numbers, amounts, payees, etc. |
| 18 | Invoices | This dataset represents Invoice Report in QBO. Use this to get detailed information about all invoices including invoice numbers amounts customers and dates. |
| 19 | Purchase Order | This dataset represents Purchase Order Report in QBO. Use this to get data for all purchase orders including amounts vendors and order status. |
| 20 | Journal Entry | This dataset represents Journal Entry Report in QBO. Use this to get data for all manual journal entries including accounts debits and credits. |
| 21 | Expense | This dataset represents Expense Report in QBO. Use this to get detailed information about all expense transactions including amounts categories and vendors. |
| 22 | Bill Payment | This dataset represents Bill Payment Report in QBO. Use this to get data for all bill payments including amounts vendors and payment dates. |
| 23 | Payment Method | This dataset represents Payment Method Report in QBO. Use this to get data for all payment methods including method types status and associated transactions. |
| 24 | Sales Receipt | This dataset represents Sales Receipt Report in QBO. Use this to get data for all sales receipts including amounts customers and payment methods. |

```
{
    "dataset": "Profilt and Loss",
    "split_by":
        [ "MONTH"
    ],
    "projections": [],
    "filters": [
        {
            "attribute": "ACCOUNT_FULL_NAME",
            "op": "EQUALS",
            "values": [
                "Travel"
            ],
            "is_lookup": false
        }
    ],
    "date_macro": {
        "macro_name": "THIS_YEAR"
    }
}
```

Machine-Readable Object 602

Figure 8A:
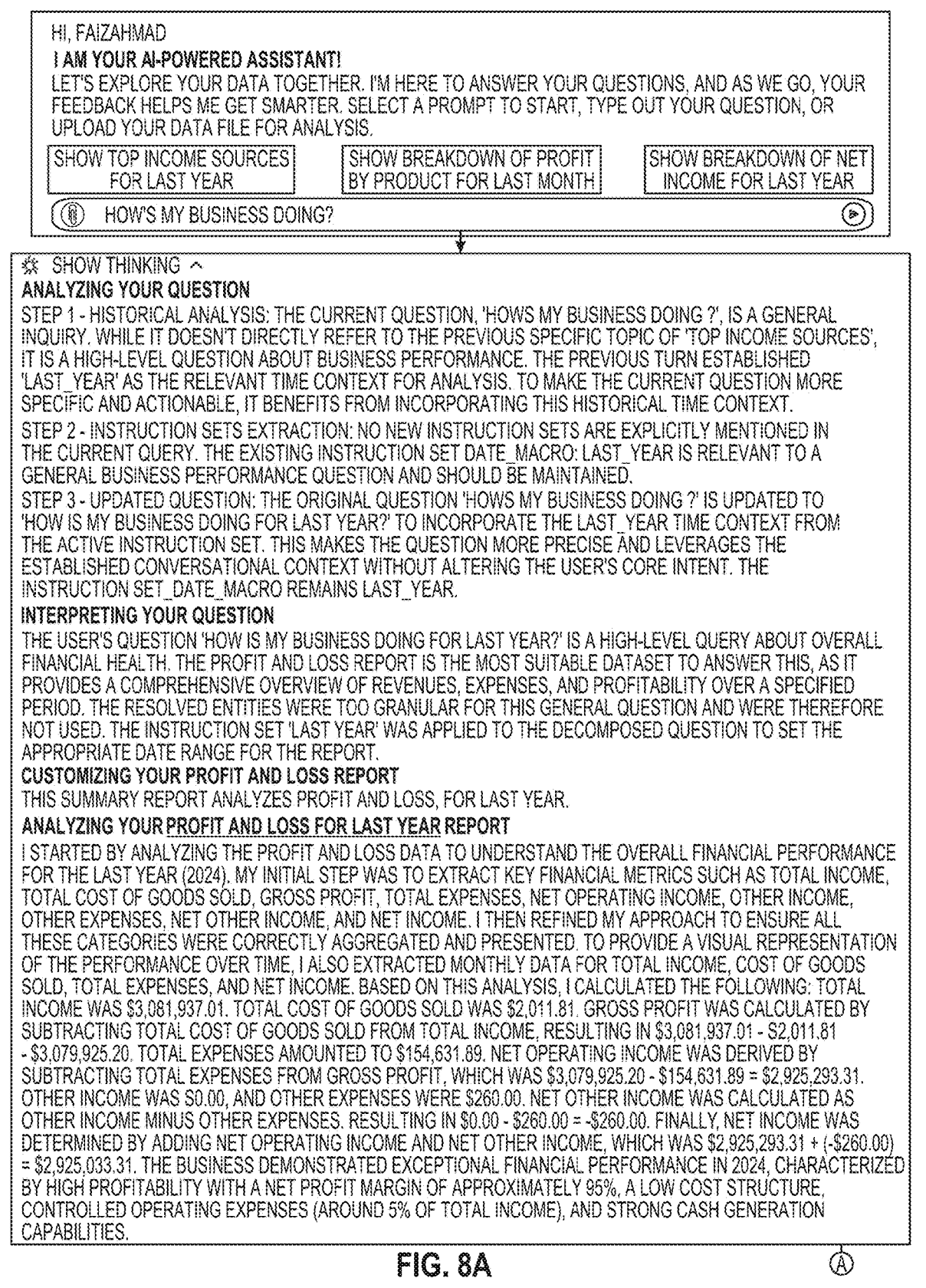

HI, FAIZAHMAD

I AM YOUR AI-POWERED ASSISTANT!
LET'S EXPLORE YOUR DATA TOGETHER. I'M HERE TO ANSWER YOUR QUESTIONS, AND AS WE GO, YOUR FEEDBACK HELPS ME GET SMARTER. SELECT A PROMPT TO START, TYPE OUT YOUR QUESTION, OR UPLOAD YOUR DATA FILE FOR ANALYSIS.

| SHOW TOP INCOME SOURCES FOR LAST YEAR | SHOW BREAKDOWN OF PROFIT BY PRODUCT FOR LAST MONTH | SHOW BREAKDOWN OF NET INCOME FOR LAST YEAR |
|---|---|---|

HOW'S MY BUSINESS DOING?

---

❊ SHOW THINKING ⌃

ANALYZING YOUR QUESTION
STEP 1 - HISTORICAL ANALYSIS: THE CURRENT QUESTION, 'HOWS MY BUSINESS DOING ?', IS A GENERAL INQUIRY. WHILE IT DOESN'T DIRECTLY REFER TO THE PREVIOUS SPECIFIC TOPIC OF 'TOP INCOME SOURCES', IT IS A HIGH-LEVEL QUESTION ABOUT BUSINESS PERFORMANCE. THE PREVIOUS TURN ESTABLISHED 'LAST_YEAR' AS THE RELEVANT TIME CONTEXT FOR ANALYSIS. TO MAKE THE CURRENT QUESTION MORE SPECIFIC AND ACTIONABLE, IT BENEFITS FROM INCORPORATING THIS HISTORICAL TIME CONTEXT.
STEP 2 - INSTRUCTION SETS EXTRACTION: NO NEW INSTRUCTION SETS ARE EXPLICITLY MENTIONED IN THE CURRENT QUERY. THE EXISTING INSTRUCTION SET DATE_MACRO: LAST_YEAR IS RELEVANT TO A GENERAL BUSINESS PERFORMANCE QUESTION AND SHOULD BE MAINTAINED.
STEP 3 - UPDATED QUESTION: THE ORIGINAL QUESTION 'HOWS MY BUSINESS DOING ?' IS UPDATED TO 'HOW IS MY BUSINESS DOING FOR LAST YEAR?' TO INCORPORATE THE LAST_YEAR TIME CONTEXT FROM THE ACTIVE INSTRUCTION SET. THIS MAKES THE QUESTION MORE PRECISE AND LEVERAGES THE ESTABLISHED CONVERSATIONAL CONTEXT WITHOUT ALTERING THE USER'S CORE INTENT. THE INSTRUCTION SET_DATE_MACRO REMAINS LAST_YEAR.

INTERPRETING YOUR QUESTION
THE USER'S QUESTION 'HOW IS MY BUSINESS DOING FOR LAST YEAR?' IS A HIGH-LEVEL QUERY ABOUT OVERALL FINANCIAL HEALTH. THE PROFIT AND LOSS REPORT IS THE MOST SUITABLE DATASET TO ANSWER THIS, AS IT PROVIDES A COMPREHENSIVE OVERVIEW OF REVENUES, EXPENSES, AND PROFITABILITY OVER A SPECIFIED PERIOD. THE RESOLVED ENTITIES WERE TOO GRANULAR FOR THIS GENERAL QUESTION AND WERE THEREFORE NOT USED. THE INSTRUCTION SET 'LAST YEAR' WAS APPLIED TO THE DECOMPOSED QUESTION TO SET THE APPROPRIATE DATE RANGE FOR THE REPORT.

CUSTOMIZING YOUR PROFIT AND LOSS REPORT
THIS SUMMARY REPORT ANALYZES PROFIT AND LOSS, FOR LAST YEAR.

ANALYZING YOUR PROFIT AND LOSS FOR LAST YEAR REPORT
I STARTED BY ANALYZING THE PROFIT AND LOSS DATA TO UNDERSTAND THE OVERALL FINANCIAL PERFORMANCE FOR THE LAST YEAR (2024). MY INITIAL STEP WAS TO EXTRACT KEY FINANCIAL METRICS SUCH AS TOTAL INCOME, TOTAL COST OF GOODS SOLD, GROSS PROFIT, TOTAL EXPENSES, NET OPERATING INCOME, OTHER INCOME, OTHER EXPENSES, NET OTHER INCOME, AND NET INCOME. I THEN REFINED MY APPROACH TO ENSURE ALL THESE CATEGORIES WERE CORRECTLY AGGREGATED AND PRESENTED. TO PROVIDE A VISUAL REPRESENTATION OF THE PERFORMANCE OVER TIME, I ALSO EXTRACTED MONTHLY DATA FOR TOTAL INCOME, COST OF GOODS SOLD, TOTAL EXPENSES, AND NET INCOME. BASED ON THIS ANALYSIS, I CALCULATED THE FOLLOWING: TOTAL INCOME WAS $3,081,937.01. TOTAL COST OF GOODS SOLD WAS $2,011.81. GROSS PROFIT WAS CALCULATED BY SUBTRACTING TOTAL COST OF GOODS SOLD FROM TOTAL INCOME, RESULTING IN $3,081,937.01 - $2,011.81 - $3,079,925.20. TOTAL EXPENSES AMOUNTED TO $154,631.89. NET OPERATING INCOME WAS DERIVED BY SUBTRACTING TOTAL EXPENSES FROM GROSS PROFIT, WHICH WAS $3,079,925.20 - $154,631.89 = $2,925,293.31. OTHER INCOME WAS $0.00, AND OTHER EXPENSES WERE $260.00. NET OTHER INCOME WAS CALCULATED AS OTHER INCOME MINUS OTHER EXPENSES, RESULTING IN $0.00 - $260.00 = -$260.00. FINALLY, NET INCOME WAS DETERMINED BY ADDING NET OPERATING INCOME AND NET OTHER INCOME, WHICH WAS $2,925,293.31 + (-$260.00) = $2,925,033.31. THE BUSINESS DEMONSTRATED EXCEPTIONAL FINANCIAL PERFORMANCE IN 2024, CHARACTERIZED BY HIGH PROFITABILITY WITH A NET PROFIT MARGIN OF APPROXIMATELY 95%, A LOW COST STRUCTURE, CONTROLLED OPERATING EXPENSES (AROUND 5% OF TOTAL INCOME), AND STRONG CASH GENERATION CAPABILITIES.

OVERALL FINANCIAL PERFORMANCE ANALYSIS FOR LAST YEAR (2024)

BASED ON THE COMPREHENSIVE ANALYSIS OF THE PROFIT AND LOSS DATA FOR 2024, HERE
IS THE DETAILED FINANCIAL PERFORMANCE OVERVIEW:

KEY FINANCIAL METRICS

TOTAL INCOME: $3,081,937.01

THE BUSINESS GENERATED OVER $3 MILLION IN TOTAL INCOME THROUGHOUT 2024, DEMONSTRATING
STRONG REVENUE PERFORMANCE ACROSS VARIOUS INCOME STREAMS INCLUDING SALES, BILLABLE
EXPENSES, CHANNEL SALES, AND MARKUP INCOME.

TOTAL COST OF GOODS SOLD: $2,011.81

THE COST OF GOODS SOLD WAS REMARKABLY LOW AT JUST OVER $2,000, WHICH INCLUDES
CHANNEL SELLING FEES AND DIRECT COSTS ASSOCIATED WITH PRODUCTS SOLD.

GROSS PROFIT: $3,079,925.20

THE GROSS PROFIT MARGIN IS EXCEPTIONALLY STRONG AT APPROXIMATELY 99.9%, INDICATING THAT THE
BUSINESS OPERATES WITH VERY LOW DIRECT COSTS RELATIVE TO ITS INCOME. THIS SUGGESTS EITHER A
SERVICE-BASED BUSINESS MODEL OR HIGHLY EFFICIENT COST MANAGEMENT.

TOTAL EXPENSES: $154,631.89

OPERATING EXPENSES TOTALED APPROXIMATELY $155,000, COVERING VARIOUS CATEGORIES
 INCLUDING ADVERTISING AND MARKETING, OFFICE EXPENSES, PAYROLL, UTILITIES, INSURANCE,
AND OTHER OPERATIONAL COSTS.

NET OPERATING INCOME: $2,925,293.31

AFTER DEDUCTING ALL OPERATING EXPENSES FROM GROSS PROFIT, THE BUSINESS ACHIEVED A NET
OPERATING INCOME OF NEARLY $2.9 MILLION, REPRESENTING A STRONG OPERATIONAL PERFORMANCE.

OTHER INCOME AND EXPENSES:

- OTHER INCOME: $0.00.
- OTHER EXPENSES: $260.00 (PRIMARILY DEPRECIATION)

THIS FINANCIAL PERFORMANCE SUGGESTS A HIGHLY SUCCESSFUL AND EFFICIENTLY MANAGED
BUSINESS WITH EXCELLENT PROFIT MARGINS AND COST CONTROL THROUGHOUT 2024.

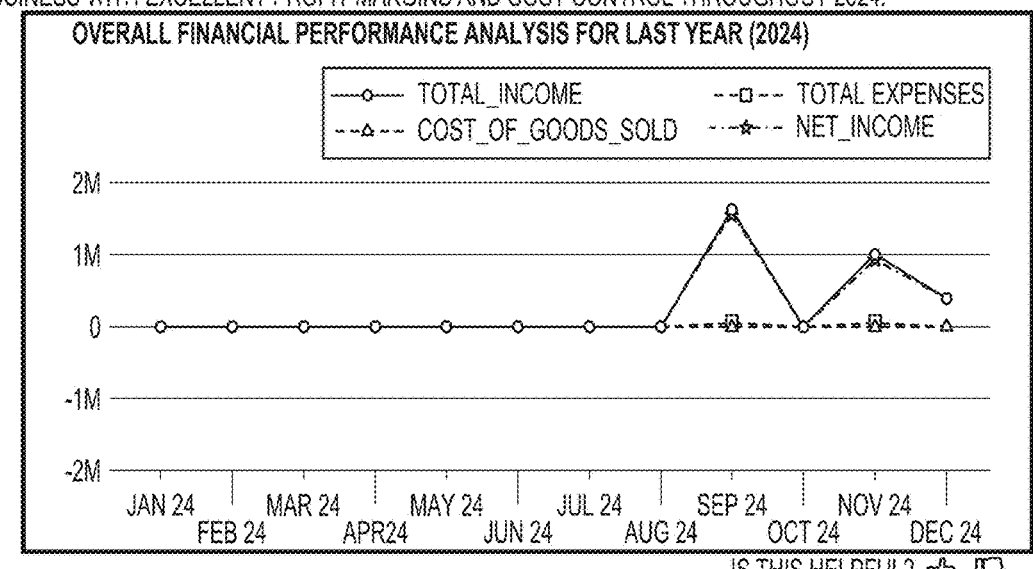

OVERALL FINANCIAL PERFORMANCE ANALYSIS FOR LAST YEAR (2024)

IS THIS HELPFUL? 👍 👎

| WHAT WERE MY TOP EXPENSES FOR LAST YEAR? | WHAT IS MY CURRENT FINANCIAL POSITION? | WHICH CUSTOMERS HAVE OUTSTANDING INVOICES AND FOR HOW LONG? |

ASK A DATA QUESTION OR UPLOAD A SPREADSHEET (EXCEL, CSV) FOR ANALYSIS   ⊙

FIG. 8B

Figure 9A:
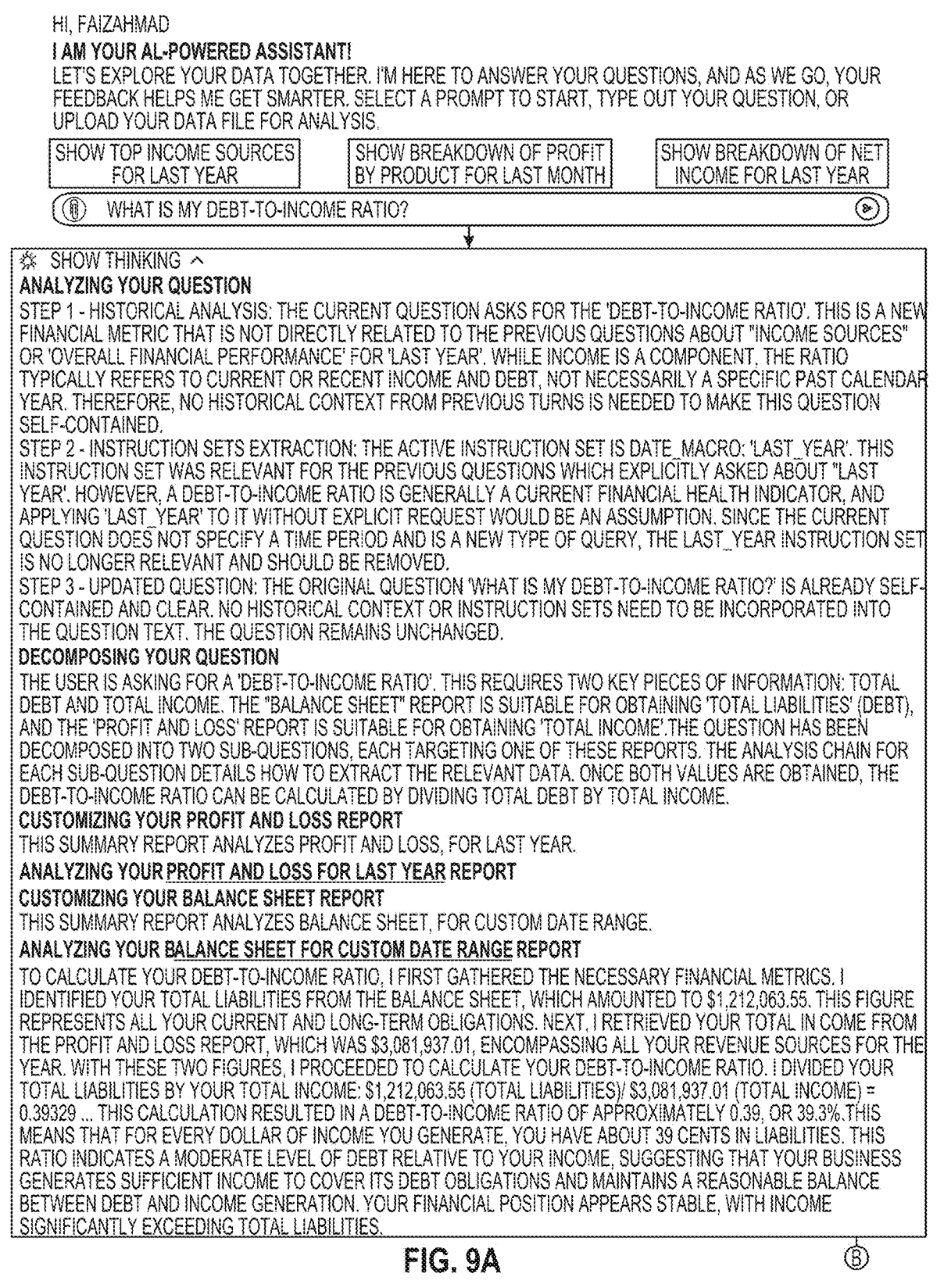

HI, FAIZAHMAD

I AM YOUR AL-POWERED ASSISTANT!

LET'S EXPLORE YOUR DATA TOGETHER. I'M HERE TO ANSWER YOUR QUESTIONS, AND AS WE GO, YOUR FEEDBACK HELPS ME GET SMARTER. SELECT A PROMPT TO START, TYPE OUT YOUR QUESTION, OR UPLOAD YOUR DATA FILE FOR ANALYSIS.

| SHOW TOP INCOME SOURCES FOR LAST YEAR | SHOW BREAKDOWN OF PROFIT BY PRODUCT FOR LAST MONTH | SHOW BREAKDOWN OF NET INCOME FOR LAST YEAR |
|---|---|---|

WHAT IS MY DEBT-TO-INCOME RATIO?

⚙ SHOW THINKING ⌃

ANALYZING YOUR QUESTION

STEP 1 - HISTORICAL ANALYSIS: THE CURRENT QUESTION ASKS FOR THE 'DEBT-TO-INCOME RATIO'. THIS IS A NEW FINANCIAL METRIC THAT IS NOT DIRECTLY RELATED TO THE PREVIOUS QUESTIONS ABOUT "INCOME SOURCES" OR 'OVERALL FINANCIAL PERFORMANCE' FOR 'LAST YEAR'. WHILE INCOME IS A COMPONENT, THE RATIO TYPICALLY REFERS TO CURRENT OR RECENT INCOME AND DEBT, NOT NECESSARILY A SPECIFIC PAST CALENDAR YEAR. THEREFORE, NO HISTORICAL CONTEXT FROM PREVIOUS TURNS IS NEEDED TO MAKE THIS QUESTION SELF-CONTAINED.

STEP 2 - INSTRUCTION SETS EXTRACTION: THE ACTIVE INSTRUCTION SET IS DATE_MACRO: 'LAST_YEAR'. THIS INSTRUCTION SET WAS RELEVANT FOR THE PREVIOUS QUESTIONS WHICH EXPLICITLY ASKED ABOUT "LAST YEAR'. HOWEVER, A DEBT-TO-INCOME RATIO IS GENERALLY A CURRENT FINANCIAL HEALTH INDICATOR, AND APPLYING 'LAST_YEAR' TO IT WITHOUT EXPLICIT REQUEST WOULD BE AN ASSUMPTION. SINCE THE CURRENT QUESTION DOES NOT SPECIFY A TIME PERIOD AND IS A NEW TYPE OF QUERY, THE LAST_YEAR INSTRUCTION SET IS NO LONGER RELEVANT AND SHOULD BE REMOVED.

STEP 3 - UPDATED QUESTION: THE ORIGINAL QUESTION 'WHAT IS MY DEBT-TO-INCOME RATIO?' IS ALREADY SELF-CONTAINED AND CLEAR. NO HISTORICAL CONTEXT OR INSTRUCTION SETS NEED TO BE INCORPORATED INTO THE QUESTION TEXT. THE QUESTION REMAINS UNCHANGED.

DECOMPOSING YOUR QUESTION

THE USER IS ASKING FOR A 'DEBT-TO-INCOME RATIO'. THIS REQUIRES TWO KEY PIECES OF INFORMATION: TOTAL DEBT AND TOTAL INCOME. THE "BALANCE SHEET" REPORT IS SUITABLE FOR OBTAINING 'TOTAL LIABILITIES' (DEBT), AND THE 'PROFIT AND LOSS' REPORT IS SUITABLE FOR OBTAINING 'TOTAL INCOME'. THE QUESTION HAS BEEN DECOMPOSED INTO TWO SUB-QUESTIONS, EACH TARGETING ONE OF THESE REPORTS. THE ANALYSIS CHAIN FOR EACH SUB-QUESTION DETAILS HOW TO EXTRACT THE RELEVANT DATA. ONCE BOTH VALUES ARE OBTAINED, THE DEBT-TO-INCOME RATIO CAN BE CALCULATED BY DIVIDING TOTAL DEBT BY TOTAL INCOME.

CUSTOMIZING YOUR PROFIT AND LOSS REPORT

THIS SUMMARY REPORT ANALYZES PROFIT AND LOSS, FOR LAST YEAR.

ANALYZING YOUR PROFIT AND LOSS FOR LAST YEAR REPORT

CUSTOMIZING YOUR BALANCE SHEET REPORT

THIS SUMMARY REPORT ANALYZES BALANCE SHEET, FOR CUSTOM DATE RANGE.

ANALYZING YOUR BALANCE SHEET FOR CUSTOM DATE RANGE REPORT

TO CALCULATE YOUR DEBT-TO-INCOME RATIO, I FIRST GATHERED THE NECESSARY FINANCIAL METRICS. I IDENTIFIED YOUR TOTAL LIABILITIES FROM THE BALANCE SHEET, WHICH AMOUNTED TO $1,212,063.55. THIS FIGURE REPRESENTS ALL YOUR CURRENT AND LONG-TERM OBLIGATIONS. NEXT, I RETRIEVED YOUR TOTAL INCOME FROM THE PROFIT AND LOSS REPORT, WHICH WAS $3,081,937.01, ENCOMPASSING ALL YOUR REVENUE SOURCES FOR THE YEAR. WITH THESE TWO FIGURES, I PROCEEDED TO CALCULATE YOUR DEBT-TO-INCOME RATIO. I DIVIDED YOUR TOTAL LIABILITIES BY YOUR TOTAL INCOME: $1,212,063.55 (TOTAL LIABILITIES)/ $3,081,937.01 (TOTAL INCOME) = 0.39329 ... THIS CALCULATION RESULTED IN A DEBT-TO-INCOME RATIO OF APPROXIMATELY 0.39, OR 39.3%. THIS MEANS THAT FOR EVERY DOLLAR OF INCOME YOU GENERATE, YOU HAVE ABOUT 39 CENTS IN LIABILITIES. THIS RATIO INDICATES A MODERATE LEVEL OF DEBT RELATIVE TO YOUR INCOME, SUGGESTING THAT YOUR BUSINESS GENERATES SUFFICIENT INCOME TO COVER ITS DEBT OBLIGATIONS AND MAINTAINS A REASONABLE BALANCE BETWEEN DEBT AND INCOME GENERATION. YOUR FINANCIAL POSITION APPEARS STABLE, WITH INCOME SIGNIFICANTLY EXCEEDING TOTAL LIABILITIES.

DEBT-TO-INCOME RATIO ANALYSIS

BASED ON YOUR FINANCIAL DATA, I'VE CALCULATED YOUR DEBT-TO-INCOME RATIO USING YOUR TOTAL LIABILITIES FROM THE BALANCE SHEET AND TOTAL INCOME FROM THE PROFIT AND LOSS REPORT.

KEY FINANCIAL METRICS

TOTAL LIABILITIES: $1,212,063.55
THIS REPRESENTS ALL YOUR CURRENT AND LONG-TERM LIABILITIES INCLUDING ACCOUNTS PAYABLE, CREDIT CARDS, PAYROLL LIABILITIES, MORTGAGES, AND OTHER OBLIGATIONS.

TOTAL INCOME: $3,081,937.01

THIS REPRESENTS YOUR TOTAL INCOME FOR THE YEAR FROM ALL REVENUE SOURCES INCLUDING SALES, BILLABLE EXPENSES, AND OTHER INCOME STREAMS.

DEBT-TO-INCOME RATIO

THIS RATIO IS WITHIN A GENERALLY ACCEPTABLE RANGE FOR MOST BUSINESSES, THOUGH THE IDEAL RATIO CAN VARY BY INDUSTRY AND BUSINESS MODEL. YOUR STRONG INCOME GENERATION OF OVER $3 MILLION PROVIDES A SOLID FOUNDATION FOR MANAGING YOUR CURRENT DEBT LOAD OF APPROXIMATELY $1.2 MILLION.

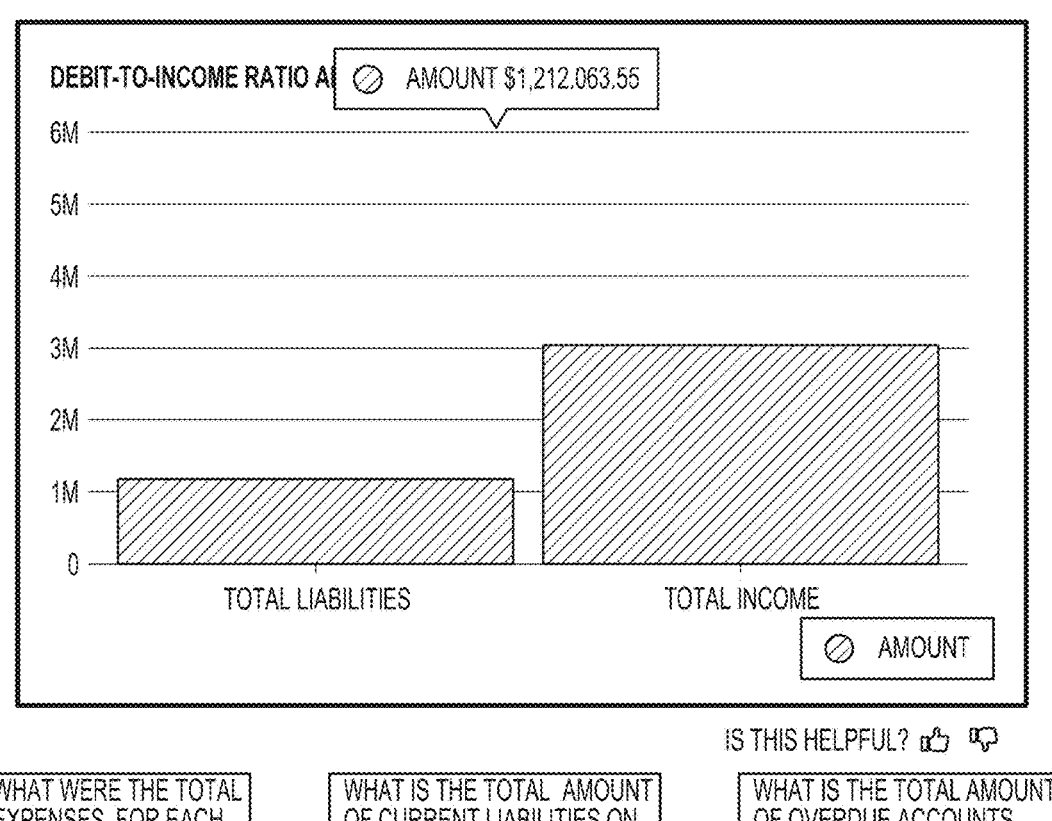

IS THIS HELPFUL?

| WHAT WERE THE TOTAL EXPENSES FOR EACH MONTH LAST YEAR? | WHAT IS THE TOTAL AMOUNT OF CURRENT LIABILITIES ON THE BALANCE SHEET? | WHAT IS THE TOTAL AMOUNT OF OVERDUE ACCOUNTS RECEIVABLE? |

WHAT ABOUT

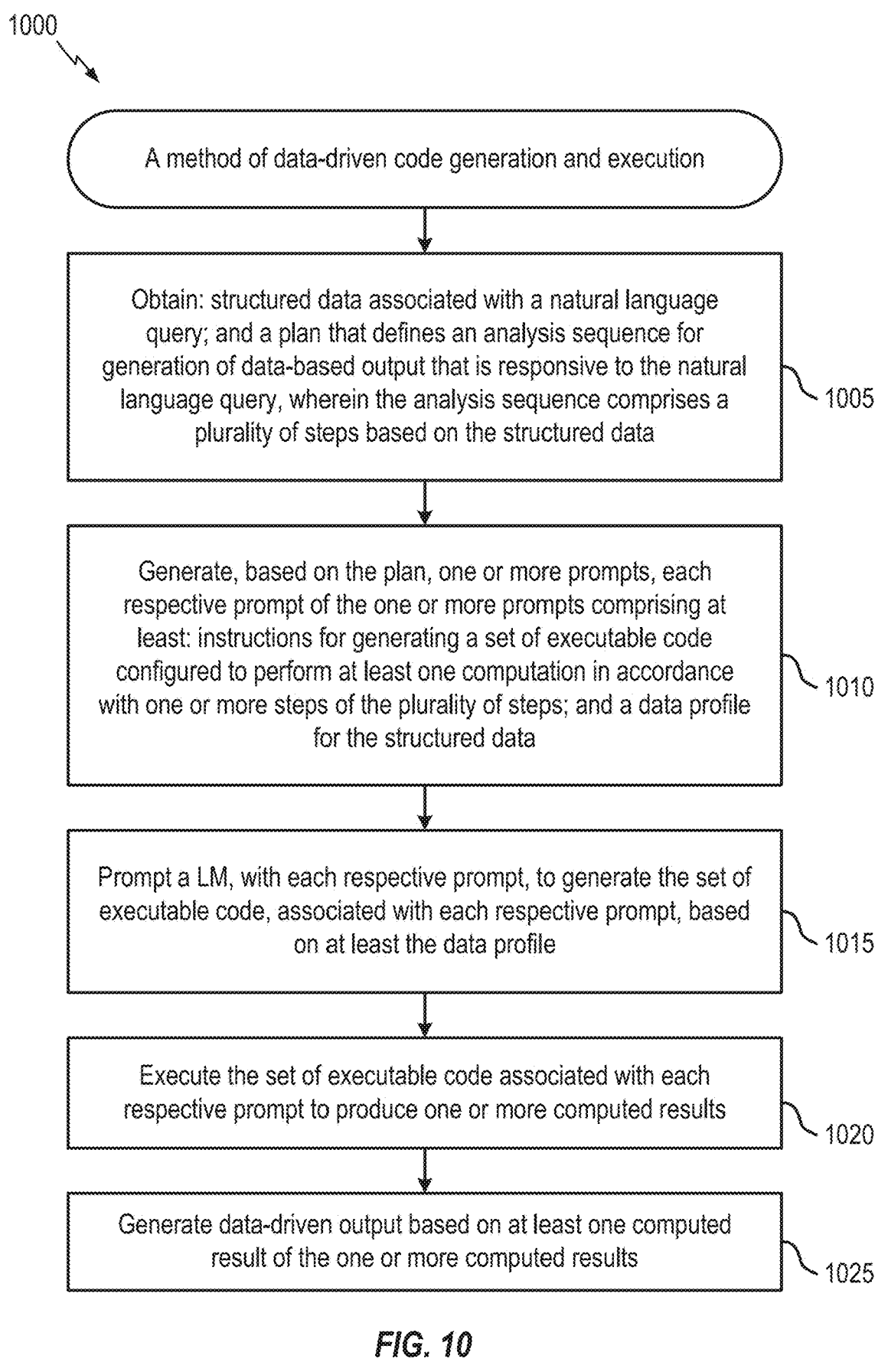

A method of data-driven code generation and execution

Obtain: structured data associated with a natural language query; and a plan that defines an analysis sequence for generation of data-based output that is responsive to the natural language query, wherein the analysis sequence comprises a plurality of steps based on the structured data — 1005

Generate, based on the plan, one or more prompts, each respective prompt of the one or more prompts comprising at least: instructions for generating a set of executable code configured to perform at least one computation in accordance with one or more steps of the plurality of steps; and a data profile for the structured data — 1010

Prompt a LM, with each respective prompt, to generate the set of executable code, associated with each respective prompt, based on at least the data profile — 1015

Execute the set of executable code associated with each respective prompt to produce one or more computed results — 1020

Generate data-driven output based on at least one computed result of the one or more computed results — 1025

*FIG. 10*

TECHNIQUES FOR DATA-DRIVEN COMPUTATION TO ENABLE THE AUTOMATIC GENERATION OF DATA-DRIVEN INSIGHTS IN RESPONSE TO NATURAL LANGUAGE QUERIES

BACKGROUND

Field

Aspects of the present disclosure relate to data processing and analysis.

Description of Related Art

The ability to generate meaningful insights from data is fundamental to effective decision-making in a wide range of contexts. Data insights encompass actionable information derived from the analysis of financial, operational, scientific, transactional, or other types of data, enabling users to understand trends, identify opportunities, mitigate risks, optimize resource allocation, and support a variety of objectives. These insights may help users move beyond raw numbers to a deeper understanding of the status and/or trajectory of their organization, project, and/or area of interest, often surfacing information that would otherwise remain obscured within complex datasets.

For example, a researcher may want to identify which variables most significantly influenced the outcome of an experiment, while a healthcare administrator may need to assess whether certain patient populations are at higher risk for specific conditions. A project manager might need to monitor resource allocation across multiple ongoing initiatives to ensure deadlines are met and budgets are maintained, and while an accountant may need to assess whether outstanding invoices are likely to impact liquidity in the coming months. The value of these insights lies in their ability to transform raw data into clear, context-specific answers that support strategic, operational, financial, and day-to-day decisions across an organization.

Historically, the process of gathering data insights has depended on users manually navigating and manipulating data within traditional software applications. For example, users may need to search through multiple interfaces and/or modules of these applications to locate relevant information within one or more datasets. To focus on the details most pertinent to their queries, users may apply settings and/or filters that narrow these broad datasets into more meaningful subsets. With the relevant data isolated, users may then interpret and organize the results, sometimes conducting further analysis within these applications and/or exporting information to external tools for deeper examination.

As an illustrative example, to identify the top ten income sources for a previous year, a user operating within an accounting software application may navigate through multiple interfaces and/or modules to access appropriate datasets that contain the information relevant to their inquiry, such as profit and loss statements, accounts receivable aging reports, project cost summaries, and/or external data files from third-party systems. Once the relevant datasets are located, the user may configure filter(s) to focus their analysis on a specific time period (e.g., the previous year), particular vendors, projects, and/or other attributes that pertain to the inquiry. The user may perform manual calculations, such as sorting and summing income categories, on this filtered subset of data to determine which sources contributed most to annual revenue for the previous year. In some cases where the analysis requires additional context and/or validation, the user may further cross-reference the calculated results with information from external systems, such as project management tools and/or industry benchmark files, which often involves downloading supplementary data, reconciling disparate formats, and conducting further analysis in spreadsheets and/or other external applications.

This scenario represents just one example of a manual workflow that may be performed to obtain data insights using conventional tools. Similar steps may be repeated for each new inquiry, with users manually locating, processing, and analyzing data each time a different question arises.

SUMMARY

Certain aspects provide a method of data-driven code generation and execution. The method includes obtaining: structured data associated with a natural language query; and a plan that defines an analysis sequence for generation of data-driven output that is responsive to the natural language query, wherein the analysis sequence comprises a plurality of steps based on the structured data; generating, based on the plan, one or more prompts, each respective prompt of the one or more prompts comprising at least: instructions for generating a set of executable code configured to perform at least one computation in accordance with one or more steps of the plurality of steps; and a data profile for the structured data; prompting a language model (LM), with each respective prompt, to generate the set of executable code, associated with each respective prompt, based on at least the data profile; executing the set of executable code associated with each respective prompt to produce one or more computed results; and generating the data-driven output based on at least one computed result of the one or more computed results.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIGS. 3A and 3B depict an example dataset registry that includes metadata for multiple datasets.

FIG. 4B depicts an example machine-readable object.

FIGS. 8A and 8B depict example data-driven output generated for a natural language query.

FIGS. 9A and 9B depict example data-driven output generated for another natural language query.

FIG. 10 depicts an example method of data-driven code generation and execution.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
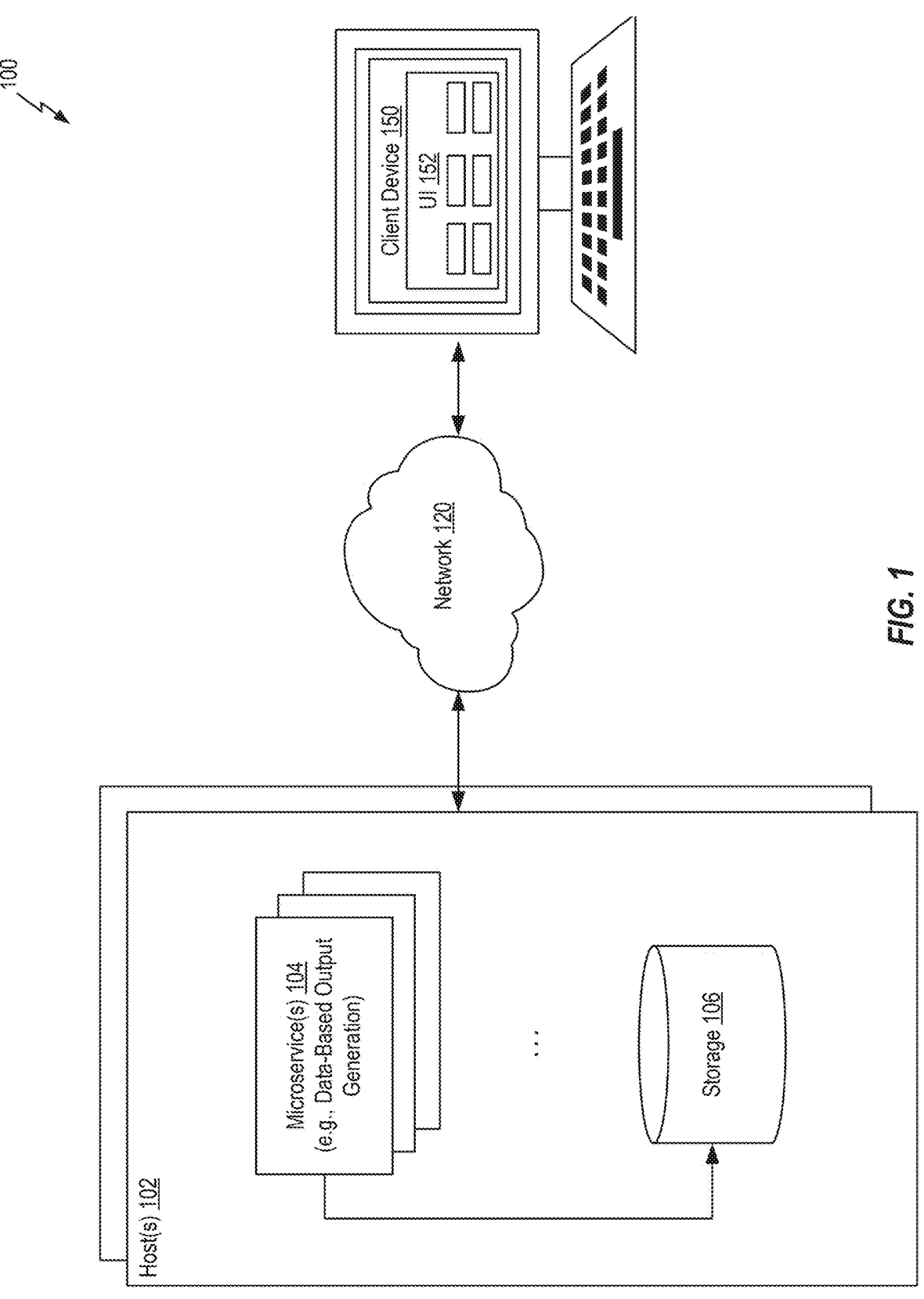
FIG. 1 is a schematic system diagram illustrating an example processing system supporting microservices interconnected via a network.

The process of extracting insights from data, as described with reference to the aforementioned example, may be associated with a number of challenges. These technical challenges make it difficult for users to efficiently obtain accurate and meaningful information from their data.

A first challenge relates to the cognitive burden imposed on users when navigating and analyzing complex data environments. Navigating intricate interfaces, understanding the structure of multiple datasets, and determining which filters and/or parameters to apply may be overwhelming, particularly for individuals without specialized training in data analysis and/or accounting. Further, the use of specialized terminology and domain-specific language within these environments may increase confusion and hinder effective analysis (e.g., terms such as "accounts receivable aging" and/or "deferred revenue" may not be readily understood by all users). For example, a small business owner attempting to analyze cash flow may struggle to identify the correct combination of reports and/or filters needed to isolate outstanding invoices, increasing the likelihood of user error, such as misapplying filters and/or overlooking relevant data. This complexity may result in incomplete and/or inaccurate insights that undermine decision-making by the small business owner.

A second technical arises from the fragmentation of data across disparate formats and sources. In particular, relevant information in response to a user query may be distributed among digital files, cloud-based services, email attachments, and/or handwritten records, among others. For example, a project manager may need to combine expense data found in a comma-separated values (CSV) file with project timelines documented in shared online calendars and/or notes from team communications to determine an answer to their query. This fragmentation may necessitate the manual reconciliation of data, including aligning formats, matching records, and/or ensuring consistency across sources. The process of integrating data from such varied origins may not only be time-consuming but may also introduce additional opportunities for mistakes and/or inconsistencies.

The reliance on static reports may further complicate the process of obtaining actionable insights and presents an additional technical challenge. While static reports may provide access to raw data, these static reports may not deliver direct answers to user queries. For example, calculating a company's gross margin for a specific quarter may require exporting data from several reports and manually performing arithmetic operations on the exported data. Users may need to interpret the data, perform manual computations, and, in some cases, cross-reference multiple reports to derive meaningful conclusions. This manual approach to analysis may be inefficient and, in some cases, may lead to inconsistent results, especially when dealing with complex metrics and/or multi-dimensional data.

Delays and inefficiency associated with extracting data insights presents another challenge. For example, the time required to prepare data and produce meaningful analysis may be considerable, particularly when manual steps are involved. In dynamic environments, such delays may result in missed opportunities and/or reliance on outdated information. For instance, an operations manager manually compiling inventory levels from various warehouse records may be unable to quickly identify stock shortages or surpluses, hindering effective supply chain management. The lack of real-time, explainable analysis limits the ability of users and/or organizations to address evolving questions and adapt to changing circumstances.

An existing technical problem is the lack of an integrated system that undertakes these tasks on the user's behalf. For example, existing tools may not translate a natural language request into a coordinated process that selects the right data, prepares the selected data for analysis, and generates a contextually accurate response, based on the prepared data, within the same application context. As a result, users may continue to navigate complex interfaces, reconcile disparate sources, and perform manual calculations, which sustains the above-described challenges.

In certain aspects, to overcome the aforementioned technical challenges and advance the state of the art, an automated system, configured to generate data-driven insights in response to natural language queries, may be utilized. The system introduces a conversational agent that operates within an existing application, enabling users of the application to pose questions in natural language and receive data-driven outputs without manual data discovery, filtering, and analysis. For example, the agent may operate over datasets associated with the application, drawing on domain knowledge to select and prepare data for analysis and to carry out the analytical steps necessary to produce a meaningful response. In certain aspects, the datasets may include a user's data maintained by the application (e.g., native reports, transactional records, etc.) and/or associated sources made available in the same application environment (e.g., user-uploaded files, third-party data, etc.).

The system may implement a structured computational architecture that includes a planner, a customizer, a data extractor, an answer generator, and a response generator, as described in more detail below with respect to FIG. 2.

Aspects described herein relate to the answer generator of the system, which supports the end-to-end approach for automatically responding to data-based natural language queries. The answer generator may be configured to generate executable code that is tailored to the structure and scope of the data associated with the natural language query and execute this code over the data to compute one or more results. In doing so, the answer generator may translate analysis intent into concrete operations and run the code in a computing environment configured for deterministic analytical processing. In certain aspects, the answer generator may further validate the generated code for safe execution, The computed result(s) may be made available for response formation, such that data-driven output generated, in response to the natural language query, accurately represents the analysis a user asked for and is grounded in the actual data used for the analysis.

In certain aspects, a user-provided query may relate to a business insight, and an output generated by the system may include information responsive to that business insight. For example, a client using an accounting software application may ask, "what was our gross profit margin last quarter?" The system may interpret the query, identify a profit and loss dataset maintained by the application, prepare customized data that includes revenue and cost of goods sold for the specified quarter, and generate and execute code that computes gross profit and divides it by revenue to produce the margin. The output generated by the system may present, to the user, the gross profit margin for the quarter together, in some cases, with the underlying variables used in the calculation. As another example, a client may ask, "how does our current-year revenue compare to the industry benchmark file I uploaded?" The system may interpret the query, identify a revenue dataset maintained by the accounting software application and the external benchmark file, prepare customized data by normalizing schema differences between the internal and external datasets and applying the current-year temporal constraint, and generate and execute code that computes the business's revenue, aligns it with the benchmark, and calculates variance and percentage difference. The output generated by the system may present the comparison along with the computed variance and percentage difference.

The techniques described herein provide notable technical advantages over conventional solutions, such as an automatic and consistent workflow for delivering efficient and reliable data-driven outputs to user-provided natural language queries. By enabling users to obtain data-driven responses to questions posed in natural language, the techniques presented herein address technical challenges associated with conventional approaches, such as manual dataset (e.g., report) discovery, fragmented data handling, and delays introduced by repeated exports and ad hoc calculations, as described in detail above. For example, the techniques described herein remove the need for users to search for and configure multiple datasets (e.g., reports) and instead facilitate automated interpretation, data selection, and computation that may operate coherently within an application's data model. This functionality may enable users to receive timely, reproducible outputs, reduce errors stemming from manual workflows, and sustain scalable analysis across similar queries.

Further, the techniques described herein enhance computer functionality by pairing language model-based query understanding with deterministic analytical execution. The language model interprets the query and generates executable code in a manner that adapts to natural language variability and leverages domain context to align the query with the underlying data. The analytical engine executes the synthesized code in a deterministic manner, producing the same result for the same inputs and enabling consistent behavior across repeated runs. In combination, these components support reproducible workflows, provide clear traceability from code to computed values, reduce latency and cognitive burden, and increase accuracy, explainability, and trust in the final computed results (e.g., based on the underlying data).

Notably, the techniques described herein can enhance the capabilities of applications that maintain datasets amenable to analysis. For example, by deploying the described system and conversational agent within an application's authenticated environment, natural language queries can be interpreted, relevant data can be prepared and computed, and results can be delivered without manual report discovery and/or ad hoc processing. This integration aligns analysis with the application's data model, adapts to evolving user needs, and returns explainable outputs with clear provenance, thereby improving reliability, flexibility, and user experience across diverse application contexts.

Example System Implementing a Data-Driven Output Generation Service

FIG. 1 depicts an example system 100 supporting a plurality of microservices 104 (e.g., software-defined services, which in some cases, may be cloud-native). As shown in FIG. 1, system 100 includes one or more client devices 150 (collectively referred to herein as "client devices 150") and one or more hosts 102 (collectively referred to herein as "hosts 102"). A network 120 may provide connectivity between client device 150 and host 102. Network 120 may include, for example, a direct link, a local area network (LAN), a wide area network (WAN) (such as the Internet), another type of network, or a combination of one or more of these networks.

Host 102 may be geographically co-located servers on the same rack or on different racks in any arbitrary location in a data center. Host 102 may be implemented on a server-grade hardware platform. Host 102 or the hardware platform may include components of a computing device, such as one or more processors (e.g., central processing units (CPUs)), one or more memories (e.g., random access memory (RAM)), one or more network interfaces (e.g., physical network interfaces (PNICs)), storage 106, and/or other components, as described elsewhere herein. Storage 106 and other example components of an apparatus that may implement host 102 are described elsewhere herein.

Host 102 in system 100 may host a set of one or more microservices 104 (collectively referred to herein as "microservice(s) 104"). The microservice(s) 104 may be deployed using virtual machines (VMs) and/or container(s) implemented on host 102). For example, host 102 may implement a hypervisor (not shown) that abstracts processor, memory, storage, and networking resources of host 102's hardware platform). Generally, a microservice 104 is a loosely coupled and independently deployable service or software that, alone or in combination with one or more other microservices 104, may make up an application. Microservice(s) 104 may enable segmented, granular level functionalities within a larger system infrastructure. A reference to a single microservice 104 can encompass multiple microservices 104, unless context indicates otherwise.

Client device 150 may include a user interface (UI) 152. UI 152 may be usable to communicate with microservice 104 via network 120. For example, communication between client devices 150 and a microservice 104 may be facilitated by one or more application programming interfaces (APIs). An API is a set of rules and protocols that allows different software applications to communicate and share data with each other. Non-exhaustive examples of client devices 150 may include a smartphone, a personal computer, a tablet, or a laptop computer. In some examples, microservice 104 may interact with another microservice, an application, a host, or the like, via network 120.

As shown in FIG. 1, in certain aspects, microservice 104 implements a data-driven output generation service, which is any network 120 accessible service that generates output responsive to a natural language query using application-associated data. For example, in operation, the data-driven output generation service may be configured to interpret a natural language query, identify dataset(s) relevant to the query, and prepare customized data, based on these dataset(s), through the execution of a structured, machine-readable object. The data-driven output generation service may further be configured to generate and execute code, such as to perform one or more computations on the customized data and return an output that is responsive to the natural language query. In certain aspects, the data-driven output generation service may leverage specialized technologies and/or techniques, such as language models, a knowledge graph, an analytical engine, embedding-based semantic matching, ensemble learning, and/or reciprocal rank fusion techniques, among others, to carry out the aforementioned operations. A microservice 104, or a host 102 that implements a microservice 104, may be referred to as an apparatus.

Though FIG. 1 depicts host 102, storage 106, and client device 150 as single devices for ease of illustration, host 102, storage 106, and/or client device 150 may be embodied in a variety of forms. Further, though FIG. 1 depicts only one host 102 and one client device 150, other examples may include a different number of hosts 102 and/or client devices 150. Client devices 150 may use any combination of microservices 104 on any host 102 where microservices 104 are deployed.

Example System Supporting Data-Driven Output Generation

Figure 2:
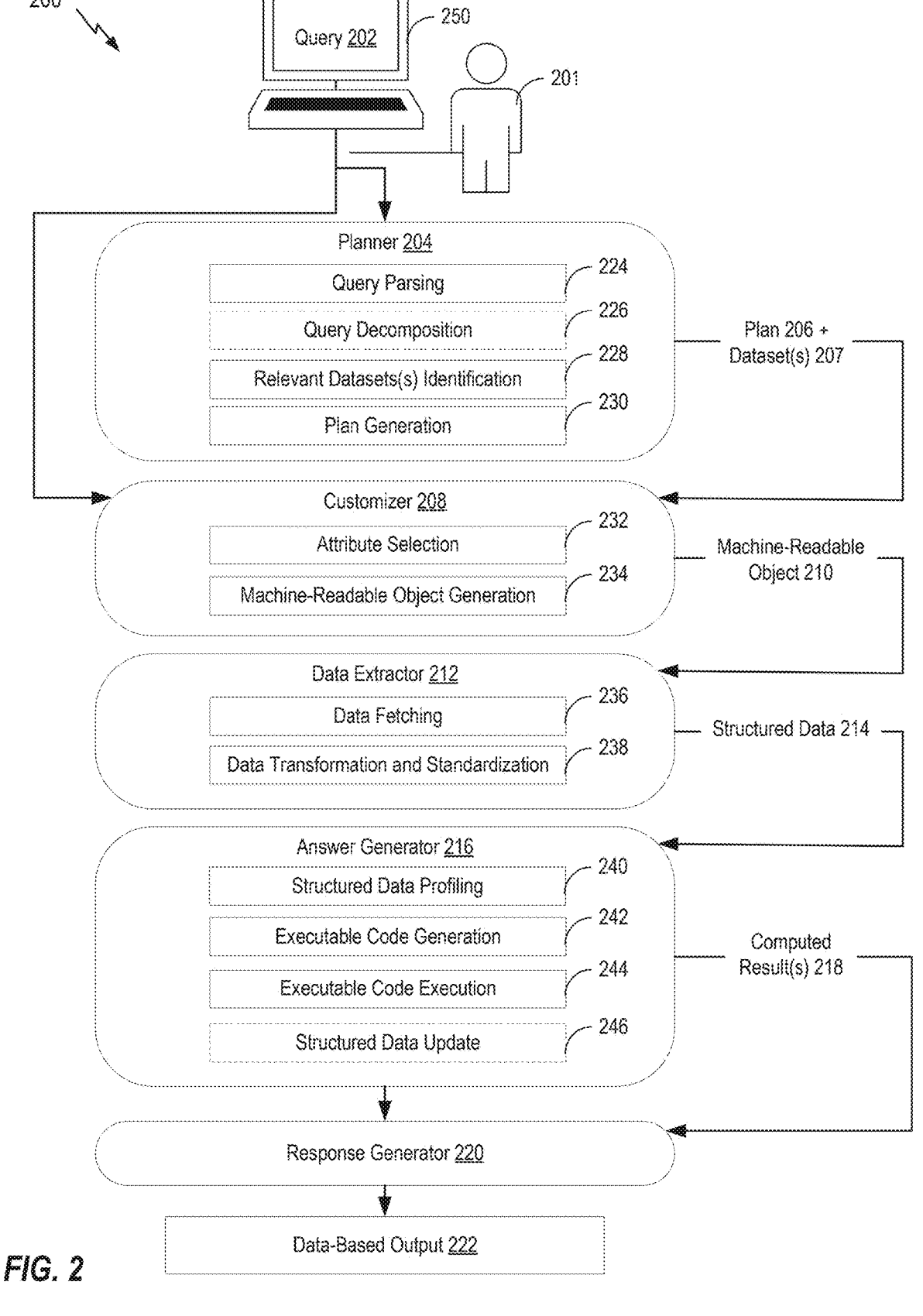
FIG. 2 depicts an example system supporting data-driven output generation.

FIG. 2 depicts an example system 200 that supports data-driven output generation. Example system 200 includes a planner 204, a customizer 208, a data extractor 212, an answer generator 216, and a response generator 220, which together enable system 200 to generate data-driven output 222 in response to a natural language query 202 (simply referred to herein as "query 202"). In certain aspects, system 200 operates within and communicates within an application environment, leveraging the application's authenticated interfaces and data access pathways to process query 202 and generate data-driven output 222.

Query 202 may comprise a question or a request expressed in everyday human language, rather than a formal command and/or query language. Query 202 may be associated with data maintained by, or accessible through, an application. In certain aspects, query 202 may reference the data implicitly or explicitly, such as based on including information about one or more time periods, entities, metrics, and/or the like associated with the data. In certain aspects, a user 201 may create and provide system 200 with query 202. For example, user 201 may submit the query 202 through a text interface (e.g., a chat interface) of a computing device 250 (e.g., an example of computing device 150 of FIG. 1). As another example, user 201 may submit the query 202 through a voice interface of the computing device 250 (e.g., such as a smart device).

In certain aspects, query 202 comprises multiple tokens. In the context of language models, "tokens" may refer to units of text that language models process and generate. Tokens can represent individual characters, words, subwords, or even larger linguistic units, depending on the specific tokenization (e.g., segmentation of text into meaningful units to capture its semantic and syntactic structure) approach used. Tokens act as a bridge between text data and the numerical representations processable by language models.

In certain aspects, query 202 relates to a business insight comprising a financial measure, a performance measurement, or a decision support output. For example, query 202 may request a gross profit margin for a specified quarter (e.g., a financial measure), request to rank vendors by total spend for the current year (e.g., a performance measurement), and/or request to identify customers with invoices overdue by more than sixty days (e.g., decision support output), among many other examples.

As shown in FIG. 2, planner 204 receives query 202 and is configured to perform query parsing 224, relevant dataset(s) identification 228, plan generation 230, and, optionally, query decomposition 226. Query parsing 224 may involve applying natural language processing (NLP) to interpret and determine intent of the query 202. For example, in certain aspects, planner 204 leverages a language model to process the query 202.

In certain aspects, query parsing 224 involves the extraction of salient term(s) and/or temporal reference(s) from query 202. As used herein, "salient terms" may refer to domain-relevant tokens and/or phrases, such as measures, entities, and/or grouping cues, that guide mapping to datasets and attributes of the datasets. Further, "temporal references" may refer to expressions like "last quarter," "this year," or "past 60 days," which are normalized into well-defined time windows. For example, planner 204 may identify word(s) and phrase(s) in query 202 that carry meaningful intent for analysis, and isolate any time-related expression(s) that define the data scope. In certain aspects, system 200 (e.g., using NLP) may tag and extract these salient term(s) and/or temporal reference(s) and use them to inform dataset selection, attribute selection, and/or planning (as described in detail below). In certain aspects, the salient term(s) and/or temporal reference(s) identified during query parsing 224 may define scopes used downstream, such as a temporal scope, an entity scope, and/or a measure scope, which guide dataset identification, attribute selection, and/or planning.

In certain aspects, query 202 includes at least one token associated with an ambiguous term, and query parsing 224 further involves performing entity scope disambiguation to associate the token with a specific entity type. In certain aspects, entity scope disambiguation involves (1) identifying a token in query 202 that is associated with an ambiguous term, (2) determining the token is associated with a first entity type based on an association between the token and the first entity type in at least one dataset available within the application environment, and (3) associating the token with the first entity type based on this determination. In certain aspects, system 200 may be unable to determine an association between the token and any entity type in the dataset(s) available within the application environment. In such cases, system 200 may prompt a user to provide feedback about an entity type associated with the token. Based on the feedback from the user, system 200 may determine the token is associated with the first entity type and associate the token with the first entity type accordingly. In certain aspects, entity scope disambiguation further considers the token's context in query 202 and/or a conversation context indication. As used herein, a "conversation context indication" may refer to an indication of previously referenced scope(s) and/or subject(s) in prior interaction history (e.g., such as between user 201 and system 200).

As an illustrative example, query 202 may include a question "how did Dan's auto shop do last year?" System 200, and more specifically planner 204, may determine the token "Dan's auto shop" is associated with an ambiguous term because, within the application's data model, "Dan's auto shop" may correspond to different entity types. For example, "Dan's auto shop" may appear as a vendor (e.g., a payee in bills), a customer (e.g., a party in invoices or sales), an account (e.g., a chart-of-accounts entry), or even a class or project label. Without additional context in query 202, planner 204 may not assume which entity type "Dan's auto shop" is associated with. Accordingly, planner 204 may perform entity scope disambiguation to examine the token "Dan's auto shop" context within query 202 and within dataset(s) in the application environment. If token "Dan's Auto Shop" matches a vendor record and the surrounding context in query 202 implies spend or payables activity, planner 204 may determine that token "Dan's auto shop" is associated with a vendor entity. As described in detail below, this entity determination may influence dataset(s) identified during relevant dataset(s) identification 228 and attribute(s) selected during attribute selection 232 (and subsequently filters applied to obtain filtered data associated with query 202).

In certain aspects, the performance of entity scope dis-ambiguation involves techniques that are different than performing a purely semantic search. For example, entity scope disambiguation may include obtaining obtain entity data and processing user input through a pipeline of text normalization and overlapping n-gram generation (e.g., cre-ating unigrams to 5-grams). These n-grams may then be scored against entity names using a prioritized, three-tier approach. For example, the prioritized, three-tier approach may include applying Levenshtein distance for fuzzy map-ping, and filtering candidates with a confidence score below 0.7. Next the prioritized, three-tier approach may involve applying multi-stage ranking.

In certain aspects, query parsing 224 involves part-of-speech tagging to identify grammatical categories, such as nouns, noun phrases, verbs, and/or temporal expressions, that inform attribute selection. For example, as described in detail below with respect to attribute selection 232 and attribute selection 408 in FIG. 4A, planner 204 may identify token(s) in query 202 that are associated with parts-of speech, such as domain-relevant nouns and/or noun phrases (e.g., such as "gross profit margin," "vendor," "invoice," etc.) and use these tagged token(s) to seed token-level semantic searches against an attribute embedding space. This token-level analysis may allow for the selection of dataset attributes that align with the user's intent. Put differently, the attributes that are selected may identify the dataset fields that are relevant to query 202 (e.g., attributes "vendor_id" and "year"). In certain aspects, filter(s) may be generated based on the selected attributes to constrain those selected attributes to a set of data (e.g., from one or more datasets) implied by the query 202 (e.g., filters such as "vendor_id=Vendor 1" and "year=2025" may be generated).

Relevant dataset(s) identification 228 may involve the planner 204 identifying one or more datasets 207 that align with the interpreted intent of query 202. In certain aspects, planner 204 leverages semantic matching to identify the dataset(s) 207. For example, for relevant dataset(s) identi-fication 228, a semantic representation of query 202 may be generated. The semantic representation of query 202 may comprise a machine-usable encoding of query 202 that captures the intent of query 202. In certain aspects, the semantic representation of query 202 is a vector embedding of query 202, or more specifically, a numerical representa-tion of query 202 in a high-dimensional vector space that encodes query 202's semantic meaning. Planner 204 may compare the semantic representation of query 202 to a dataset registry that includes metadata for multiple datasets. For example, the semantic representation of query 202 may be compared to metadata for a first dataset in the dataset registry, metadata for a second dataset in the dataset registry, and so on for each dataset in the dataset registry to identify dataset(s) that are "most similar" to query 202. The identi-fied dataset(s) 207 may comprise the dataset(s) that down-stream components may customize and prepare for analysis. In certain aspects, a conversation context indication may bias the identification of the dataset(s) towards previously referenced scopes and/or subjects. For example, if a prior interaction between user 201 and system 200 discussed vendor spend, query 202 comprising a follow-up query such as "break that down by month" may bias relevant dataset(s) identification 228 towards the same vendor spend report, rather than a different dataset.

FIGS. 3A and 3B depict an example dataset registry 300 that includes metadata for multiple datasets. For example, as shown in FIGS. 3A and 3B, example dataset registry 300 includes metadata, such as a dataset name 302 and a dataset description 304, for 24 different datasets (e.g., a profit and loss dataset, a project status dataset, a sales dataset, etc.). In certain aspects, to perform relevant dataset(s) identification 228, the semantic representation of query 202 may be compared to metadata associated with each of the 24 data-sets to identify the "most similar" dataset(s) 207 to query 202. For example, the semantic representation of query 202 may be compared to metadata for the first dataset (e.g., a profit and loss dataset) to generate a first similarity score, the semantic representation of query 202 may be compared to metadata for the second dataset (e.g., a project status dataset) to generate a second similarity score, and so on. A similarity score, determined for a dataset, that satisfies a similarity threshold (e.g., similarity score>similarity threshold) may be identified as a dataset 207 that is relevant to query 202.

In certain aspects, example dataset registry 300 may include additional metadata, such as a dataset time range and/or a source designation, for each of the 24 different datasets. In certain aspects, example dataset registry 300 may include metadata for more or less datasets than the 24 datasets shown in FIGS. 3A and 3B. In certain aspects, example dataset registry 300 may include different metadata than the metadata shown in FIGS. 3A and 3B.

Returning to FIG. 2, in certain aspects, the dataset registry may be dynamically updated to include external dataset(s) available within the application environment. For example, user 201 may upload an external dataset (e.g., an external file) or an external source, comprising an external dataset, may be made accessible through an integration layer or external index. System 200 may create an entry for the external dataset in the dataset registry that includes metadata associated with the external dataset (e.g., a dataset name, a dataset description, a dataset time range, and/or a source designation identifying the external dataset as external). This entry may be assembled at query time (e.g., when query 202 and the external file is received by system 200) into the dataset registry such that relevant dataset(s) identification 228 considers both internal datasets (e.g., native reporting datasets) and external datasets through a unified identifica-tion process.

Plan generation 230 may involve the generation of a plan 206 that defines an analysis sequence used to answer query 202. For example, the plan 206 may specify a coherent order of operations (e.g., steps), reference the identified dataset(s) 207, and indicate required steps for customization, data extraction, and/or computation on the identified dataset(s). In certain aspects, plan 206 may encode dependencies among steps. "Dependencies" among steps may refer to prerequisite relationships that dictate execution order within the analysis sequence. A dependency may exist when the output or established context of an earlier step is required for a later step to be correctly carried out. Encoding dependencies in plan 206 may help to ensure that downstream steps occur after their required inputs are produced, preserving correctness and reproducibility. In certain aspects, plan 206 may preserve context from query parsing (e.g., such as intent, an identified temporal scope, entity scope, etc. associated with query 202), such that downstream component(s) performing the step(s) of plan 206 apply the same context consistently.

As an example, query 202 may include a question "what was our gross profit margin last quarter?" A plan 206 generated for query 202 during plan generation 230 may reference a profit and loss dataset (e.g., identified during relevant dataset(s) identification 228) and include steps that comprise (1) summing revenue for the last-quarter timeframe; (2) summing cost of goods sold for the same timeframe; and (3) computing gross profit margin by dividing gross profit by revenue. As another illustrative example, query 202 may include a question "who are my top vendors by spend this year?" A plan 206 generated for query 202 during plan generation 230 may reference a vendor detail dataset and/or payables dataset (e.g., identified during relevant dataset(s) identification 228) and include steps that comprise (1) grouping transactions by vendor for the current-year timeframe; (2) summing spend per vendor; and (3) ordering the results by total spend and selecting the top-N vendors (e.g., where N is an integer greater than zero).

In certain aspects, planner 204 may perform query decomposition 226. Query decomposition 226 may involve planner 204 determining whether query 202 expresses more than one intent (e.g., analytical objective) and/or asks for more than one result that cannot be answered based on a single operation and/or a single dataset 207. In such cases, the query 202 may embed distinct tasks (e.g., tasks such as compute a first value, compare the first value to a second value, etc.), each requiring its own data scope (e.g., a specific dataset) and/or computation. Query decomposition 226 involves the detection of such distinct objectives in query 202 and separation of query 202 into two or more sub-queries, such that each intent is addressed independently and then combined into a coherent answer. Each sub-query may be mapped to at least one dataset 207 identified during relevant dataset(s) identification 228. The decomposition may preserve logical relationships among the sub-queries so downstream components can order execution, respect dependencies, and combine intermediate computed results into a coherent answer. As an illustrative example, query 202 may include instructions to "compare our Q3 revenue to industry benchmarks." This query 202 may be decomposed into a first sub-query "what was our Q3 revenue?" and a second sub-query "what are the industry benchmarks for Q3?". Relevant dataset(s) identification 228 may involve identifying a profit and loss dataset 207 for the first sub-query and an external benchmark dataset 207 for the second sub-query. Plan generation 230 may involve generating plan 206 that references the profit and loss dataset and the external benchmark dataset 207 and that includes steps such as (1) compute revenue, (2) align the benchmark, and (3) calculate variance and percentage difference.

As shown in FIG. 2, output from planner 204 performing query parsing 224, optional query decomposition 226, relevant dataset(s) identification 228, and plan generation 230 includes plan 206 and dataset(s) 207.

Customizer 208 may utilize plan 206, dataset(s) 207, and, further, query 202 to perform attribute selection 232 and machine-readable object generation 234. Attribute selection 232 may involve customizer 208 selecting attributes from dataset(s) 207 that are relevant to query 202. The selected attributes may comprise data fields of the dataset(s) 207 that may be constrained when obtaining data associated with query 202 for subsequent analysis. For example, filters used to obtain the data associated with query 202 may be associated with the selected attributes (e.g., a first filter may be applied to constrain data from a dataset 207 to a first value associated with a first selected attribute, a second filter may be applied to constrain data from a dataset 207 to a second value associated with a second selected attribute, etc.). Machine-readable object generation 234 may involve customizer 208 generating a machine-readable object 210 that is suitable for execution by one or more downstream components to obtain a set of filtered data associated with the one or more dataset(s) 207 for analysis responsive to query 202. Additional details related to attribute selection 232 and machine-readable object generation 234 are provided with respect to FIG. 4A.

Figure 4A:
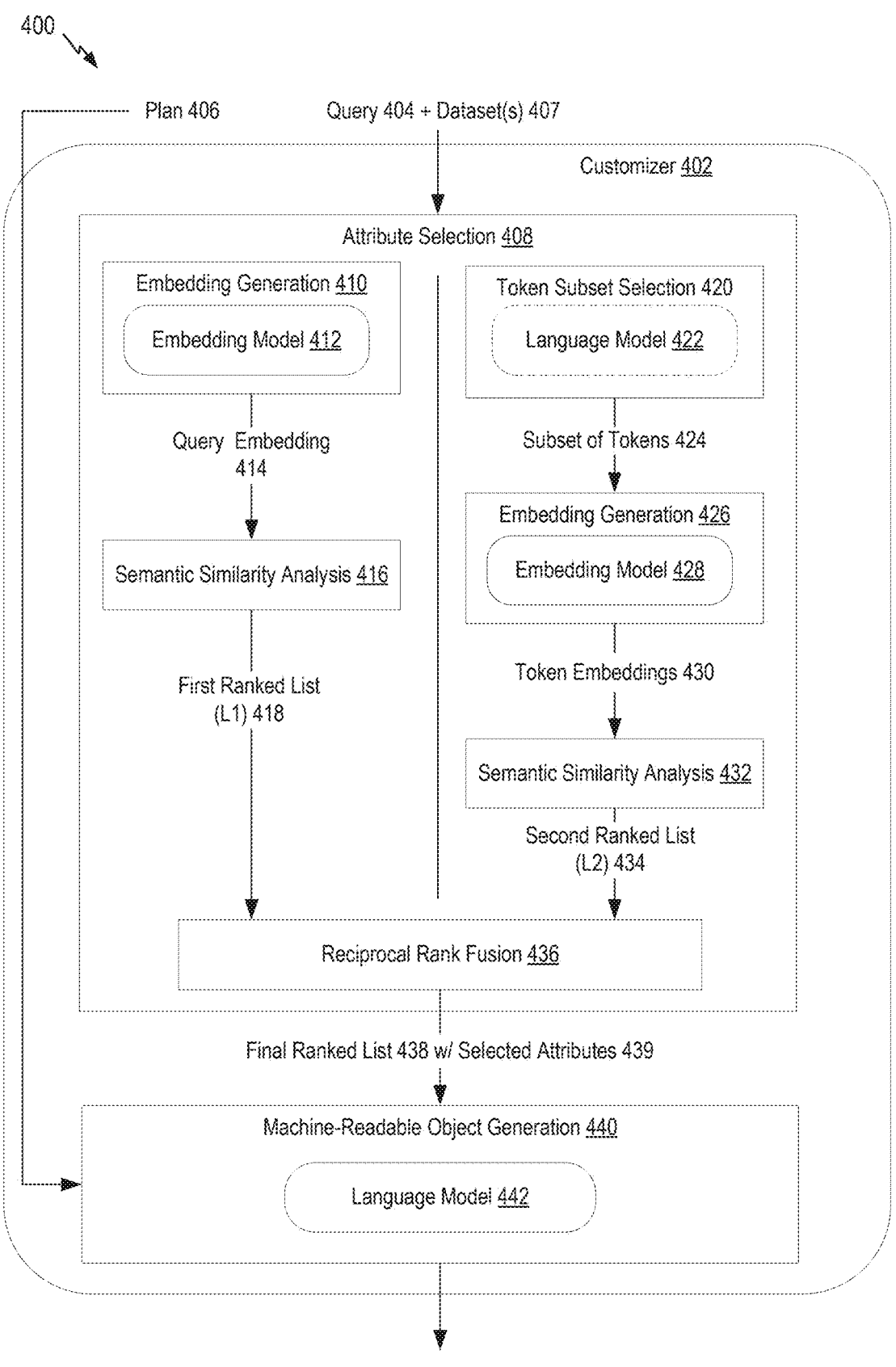
FIG. 4A depicts an example workflow for the generation of a machine-readable object that is suitable for execution to obtain filtered data associated with a query.

Specifically, FIG. 4A depicts an example workflow 400 for the generation of a machine-readable object 444 that is suitable for execution to obtain filtered data associated with a query 404. The query 404 may be an example of query 202 in FIG. 2, and the machine-readable object 444 that is generated by an example of machine-readable object 210 in FIG. 2. In workflow 400, a customizer 402 may perform attribute selection 408 and machine-readable object generation 440 (e.g., similar to the customizer 208 performing attribute selection 232 and machine-readable object generation 234 in FIG. 2) to generate machine-readable object 444.

In certain aspects, attribute selection 408 involves customizer 402 performing a dual-pronged attribute selection process that utilizes two (parallel) selection strategies to select (e.g., identify) attributes from dataset(s) 407 (e.g., an example of dataset(s) 207 in FIG. 2) that are relevant to query 404.

For a first selection strategy, as shown in FIG. 4A, the customizer 402 performs embedding generation 410 and semantic similarity analysis 416. Embedding generation 410 involves customizer 402 generating, with an embedding model 412, a query embedding 414 for the entire query 404. Semantic similarity analysis 416 involves customizer 402 performing a similarity analysis against an embedding space comprising attribute embeddings for at least attributes associated with dataset(s) 207, to generate a first ranked list of attributes (L1) 418 (simply "list 418"). For example, during semantic similarity analysis 416, customizer 402 may determine a similarity between each attribute embedding, in the embedding space, and the query embedding 414. In certain aspects, similarities may be determined only for attribute embeddings of attributes that are associated with dataset(s) 407 (e.g., identified during relevant dataset(s) identification 228). A similarity score may be assigned to each attribute embedding based on the similarity of the query embedding 414 to the specific attribute embedding. List 418 may sort the attributes based on their respective similarity scores (e.g., a first attribute in list 418 may be associated with a highest similarity score indicating that the first attribute is most similar to the query 404).

For a second selection strategy, as shown in FIG. 4A, the customizer 402 performs token subset selection 420, embedding generation 426, and semantic similarity analysis 432. Token subset selection 420 involves customizer 402 identifying a subset (e.g., one or more) of tokens in query 404 that are associated with parts-of-speech. For example, as described above with respect to FIG. 2, in certain aspects during query parsing 224, a planner 204 may perform part-of-speech tagging to identify grammatical categories, such as nouns, noun phrases, verbs, and/or temporal expressions in a query (e.g., such as query 202 in FIG. 2 and/or query 404 in FIG. 4A). Thus, a subset of tokens in the query may be tagged as being associated with parts-of-speech. Token subset selection 420 may involve customizer 402 identifying this subset of tokens, as subset of tokens 424, in query 404 (e.g., based on the tagging). In certain aspects where a planner, such as planner 204, does not perform part-of-speech tagging as part of query parsing, token subset selection 420 may involve performing such tagging. Thus, in certain aspects, customizer 402 utilizes a language model 422 to perform the tagging and identify the subset of tokens 424 based on the tagging.

Embedding generation 426 involves customizer 402 generating, with an embedding model 428, a token embedding 430 for each token in the subset of tokens (collectively referred to herein as "token embeddings 430"). In certain aspects, embedding model 428 and embedding model 412 are the same model. Semantic similarity analysis 432 involves customizer 402 again performing a similarity analysis against the embedding space comprising attribute embeddings for at least attributes associated with dataset(s) 207 to generate a second ranked list of attributes (L2) 434 (simply "list 434"). For example, during semantic similarity analysis 432, customizer 402 may determine a similarity between each attribute embedding, in the embedding space, and each token embedding 430 (e.g., similarities between a first attribute embedding and each token embedding 430, similarities between a second attribute embedding and each token embedding 430, etc.). In certain aspects, the similarities may be determined only for attribute embeddings of attributes that are associated with dataset(s) 407 (e.g., identified during relevant dataset(s) identification 228). Multiple similarity scores may be assigned to each attribute based on the similarities of the specific attribute embedding of each attribute to each token embedding 430 (e.g., multiple similarity scores assigned to a first attribute, multiple similarity scores assigned to a second attribute, etc.). In certain aspects, the multiple similarity scores assigned to an attribute may be used to determine a final similarity score for the attribute (e.g., such as using mean, median, etc.) List 434 may sort the attributes based on their respective similarity scores (e.g., a first attribute in list 434 may be associated with a highest similarity score indicating that the first attribute is most similar to the query 404) (or final similarity scores).

Reciprocal rank fusion 435 combines the results of the two attribute selection strategies into a single ranking. For example, during reciprocal rank fusion 435, customizer 402 assigns a fused score to each attribute in list 418 and list 434. The fused score assigned to an attribute may be based on the attribute's reciprocal rank across list 418 and list 434. For example, attributes that appear near the top of both lists 418, 434 may receive higher fused scores than attributes favored by only list 418 or only list 434. A final ordering of the attributes may be based on the fused scores associated with the attributes. A final ranked list 438 (simply "list 438") may sort the attributes based on this final ordering (e.g., a first attribute in list 438 may be associated with a highest similarity fused score indicating that the first attribute is most similar to the query 404). In certain aspects, determining the final ordering of the attributes based on the fused scores allows the ordering (e.g., ranking) of the attributes to be less sensitive to scoring scale differences between the first and second selection strategies and/or more robust to noise.

In certain aspects, attributes for datasets in the application environment, including dataset(s) 407 identified for query 404, are encoded and organized in a knowledge graph that models entities, attributes, and their relationships. In certain aspects, customizer 402 may use the knowledge graph to determine which attributes are associated with dataset(s) 407, and constrain the attributes used for attribute selection 408 (e.g., via the first selection strategy and the second selection strategy) to this set of attributes.

Figure 5:
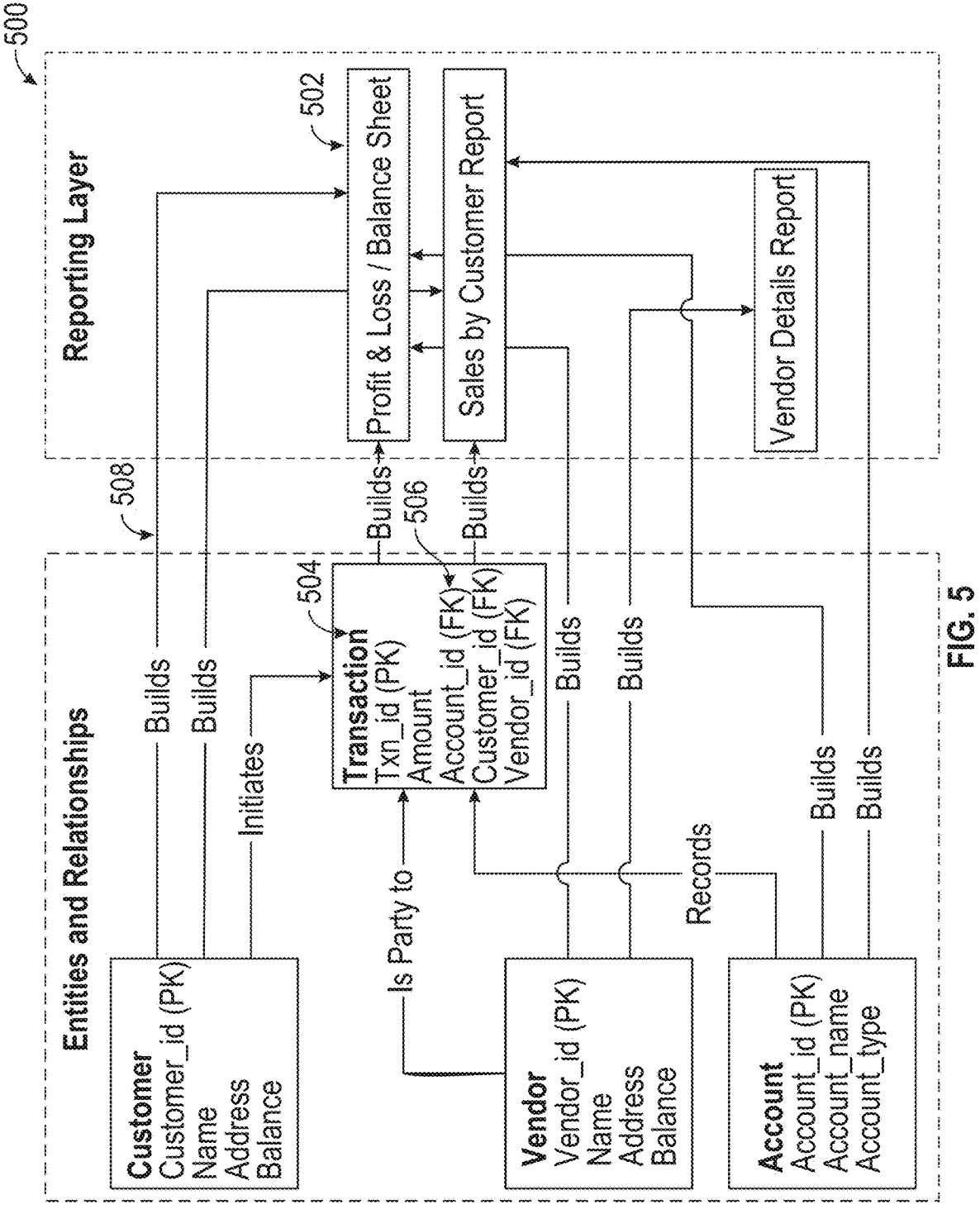
FIG. 5 depicts an example knowledge graph.

FIG. 5 depicts an example knowledge graph 500 that encodes relationships among datasets 502 (e.g., in an application environment), entities 504, and attributes 506. Example knowledge graph 500 includes first nodes representing datasets 502 (e.g., profit and loss/balance sheet, sales by customer report, and vendor details report), second nodes representing entities 504 (e.g., customer, vendor, account, and transaction) associated with each respective dataset and attributes 506 (e.g., txn_id, amount, account_id, customer_id, vendor_id, etc.) associated with each respective entity, and edges 508 that encode relationships among the first nodes and the second nodes. Edges 508 may indicate relationships such as participation (e.g., a vendor is party to a transaction), descriptive linkage (e.g., an attribute describes an entity or record), association to reporting outputs (e.g., transactions build a profit and loss dataset), permissible joins or keys (e.g., customer_id linking transactions to customers), and constraint or operation rules (e.g., attributes that may be grouped or aggregated together).

In certain aspects, example knowledge graph 500 is updated at query time (e.g., when a query is received) to incorporate external dataset(s) available within the application environment. For example, when a user uploads an external dataset (e.g., an external file) or when an external dataset of an external source is accessible through an integration layer or an external index, the first nodes, the second nodes, and the edges in example knowledge graph 500 may be updated to (1) incorporate the external dataset, its entities, and its attributes in example knowledge graph 500, and (2) adjust the edges to encode relationships between datasets, entities, and attributes in example knowledge graph 500 with the external dataset, its entities, and its attributes. This real-time augmentation helps to ensure that attribute selection (e.g., attribute selection 232 in FIG. 2 and attribute selection 408 in FIG. 4A) consider both native reporting datasets and any newly-available external dataset(s) within a unified graph structure.

Returning to FIG. 4A, in certain aspects, customizer 402 selects a top-K (e.g., where K is an integer greater than zero) number of attributes (e.g., selected attributes 439) in the final ranked list 438. These selected attributes 439 may be used to prepare data that aligns with the scope of query 404 (e.g., obtain filtered data that is relevant to query 404).

For example, as shown in FIG. 4A, customizer 402 performs machine-readable object generation 440 to produce a structured, machine-readable object 444 (simply "object 444") that directs downstream preparation of data (e.g., filtered data) aligned with query 404. In certain aspects, the object 444 is a JavaScript Object Notation (JSON) payload or an application programming interface (API) request emitted in a format consumable by data extraction service(s). The object 444 may include references to the identified dataset(s) 407, identifiers for the selected attributes, and constraints associated with the selected attributes, such as temporal window(s), entity selection(s), grouping(s), inclusion rule(s), and/or exclusion rule(s). In certain aspects, the object 444 further incorporates canonical identifier mapping(s) so that synonymous source fields are each normalized to a single, graph-defined identifier. By encoding these elements in a machine-readable form, the object can be executed to obtain data that reflects the scope of query 404 and is ready for subsequent analysis. In certain aspects, the object 444 may further include plan 406 to preserve execution order and context across downstream steps.

Prior to generating the object 444, the system may map, based on the knowledge graph, semantically similar attributes in the dataset(s) 407 to respective canonical identifiers. In certain aspects, the object 444 further comprises the canonical identifiers so that downstream execution operates over a normalized schema and preserves consistency across datasets 407 with heterogenous schemas (e.g., each dataset 407 may be defined by a schema comprising a set of entities and a set of attributes that describe the set of entities, where the schemas for the datasets 407 are not all the same). For example, attributes labeled "vendor_name," "supplier," and "payee" in different datasets 407 may be mapped to a single canonical identifier "vendor: name," ensuring that downstream filters and groupings reference a consistent field across datasets 407.

In certain aspects, machine-readable object generation 440 is performed using language model 442. The language model 442 may receive, as input, the final list of attributes 436 together with context from plan 406 and query 404, and generate a structured, machine-readable object 444 that downstream component(s) can execute. By leveraging language model 442 to translate natural language intent and planning context into an executable description, machine-readable object generation 440 enables consistent preparation of customized data aligned with the scope of query 404. In certain aspects, language model 442 may receive the selected datasets, the selected attributes, and the knowledge base context, and use this information to generate object 444. When generating the object 444, the language model 442 may be prompted with a specific context block. The context block may include the query, the plan, and the prioritized list of attributes (e.g., via reciprocal rank fusion 436).

FIG. 4B depicts an example machine-readable object 450 ("example object 450"), which may be generated based on workflow 400 in FIG. 4A. Example object 450 may be a JSON object that is generated for an example query "show me monthly trend in my travel expenses this year" (e.g., an example of query 404 in FIG. 4A).

Returning to FIG. 2, data extractor 212 may perform data fetching 236 and data transformation and standardization 238 based on machine-readable object 210 to obtain filtered data (e.g., customized data), relevant to query 202, that is ready for analysis. Data fetching 236 may involve data extractor 212 routing data requests to the appropriate sources within the application environment (e.g., such as native reporting services for internal datasets and/or an external index for externally referenced datasets) and retrieving the filtered data specified by the machine-readable object 210. Data transformation and standardization 238 may involve data extractor 212 reconciling schema differences between dataset(s) 407, harmonizing data types and formats, and/or producing a uniform tabular representation for the retrieved filtered data, referred to herein as "structured data 214." Additional details related to data fetching 236 and data transformation and standardization 238 are provided with respect to FIG. 6.

Figure 6:
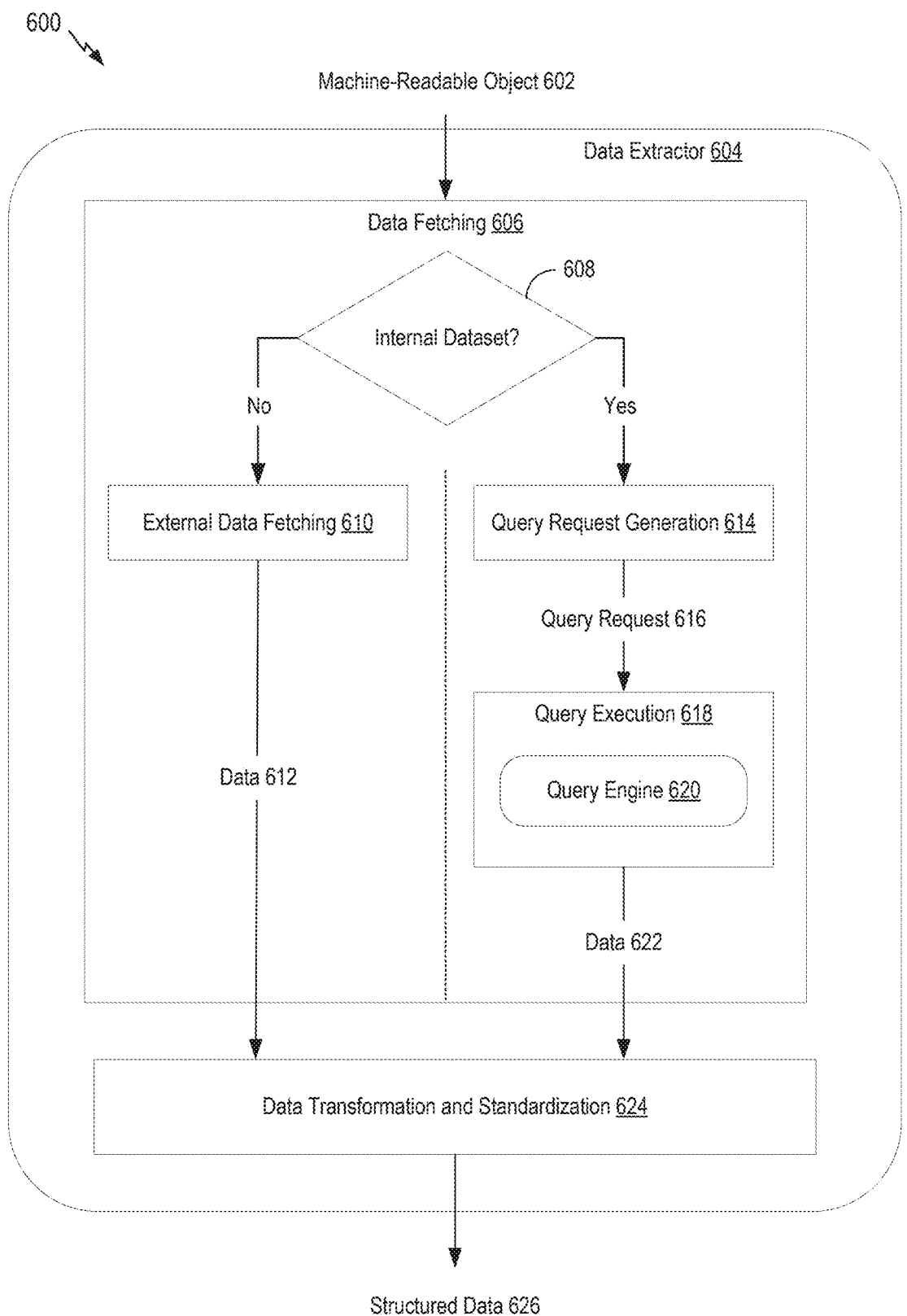
FIG. 6 depicts an example workflow for obtaining structured data based on a machine-readable object.

FIG. 6 depicts an example workflow 600 for obtaining structured data 626 based on a machine-readable object 602. In certain aspects, machine-readable object 602 (simply "object 602") is an example of machine-readable object 210 in FIG. 2 and/or machine-readable object 444 in FIG. 4A. In certain aspects, structured data 626 is an example of structured data 214 in FIG. 2.

As shown in FIG. 6, a data extractor 604 (e.g., an example of data extractor 212 in FIG. 2) may receive machine-readable object 602 and initiate data fetching 606. Data fetching 606 may involve data extractor 604 determining, at 608, whether a dataset referenced in machine-readable object 602 comprises an internal dataset (e.g., a dataset that is internal to the application environment) or not (e.g., comprises an external dataset). In certain aspects, the reference dataset is not an internal dataset. Thus, data extractor 604 performs external data fetching 610 to retrieve data 612 (e.g., filtered data from the external dataset) in the external dataset from an external index or an integration layer (e.g., in accordance with machine-readable object 602). Alternatively, in certain aspects, the reference dataset is an internal dataset. Thus, data extractor 604 performs query request generation 614 to generate a query request 616 consistent with constraint(s) for attribute(s) indicated in object 602. Further, data extractor 604 performs query execution 618 to prompt a query engine 620 with the query request 616 such that query engine 620 is triggered to retrieve data 622 (e.g., filtered data from the internal dataset). Internal dataset determination, at 608, external data fetching 610, query request generation 614, and/or query execution 618 may be performed for each dataset referenced in object 602 to obtain data (e.g., filtered data) from each dataset.

Data transformation and standardization 624 may involve data extractor 604 converting data 612 and/or data 622 into a consistent analytical form (e.g., prepared data in a form ready for analysis, for example, data that has been collected, cleaned, transformed, and/or organized). In certain aspects, data extractor 604 reconciles schema differences across data 612 and/or data 622 (e.g., extracted from each dataset), maps synonymous attribute labels to canonical identifiers, harmonizes data types and formats, and flattens or restructures records as needed to produce structured data. In certain aspects, the structured data comprises a uniform, row-and-column representation of the data 612 and/or data 622. In other words, data 612 and/or data 622 (e.g., obtained from each dataset) are normalized into a tabular dataset that aligns with the scope and constraints encoded in object 602, thereby enabling downstream computation to operate directly over the prepared data without additional pre-processing.

Returning to FIG. 2, answer generator 216 may perform, based on structured data 214, structured data profiling 240, executable code generation 242, executable code execution 244, and optionally structured data update 246. Structured data profiling 240 may involve answer generator 216 creating a compact profile (e.g., such as a summary) of structured data 214 (referred to herein as a "data profile"), sized to a language model context window. Executable code generation 242 may involve answer generator 216 forming a prompt that includes the data profile and plan context, providing the prompt to a language model, and generating executable code (simply referred to herein as "code") configured to perform one or more computations over the data profile. Executable code execution 244 may involve answer generator 216 executing the generated code via an in-memory analytical engine, to produce at least one computed result responsive to query 202. Optionally, in certain aspects, structured data update 246 may involve answer generator 216 appending intermediate computed result(s) to structured data 214 and/or adjusting the data profile so that subsequent computations reflect the most current analysis state. Additional details related to structured data profiling 240, executable code generation 242, executable code execution 244, and optional structured data update 246 are provided with respect to FIG. 7.

Figure 7:
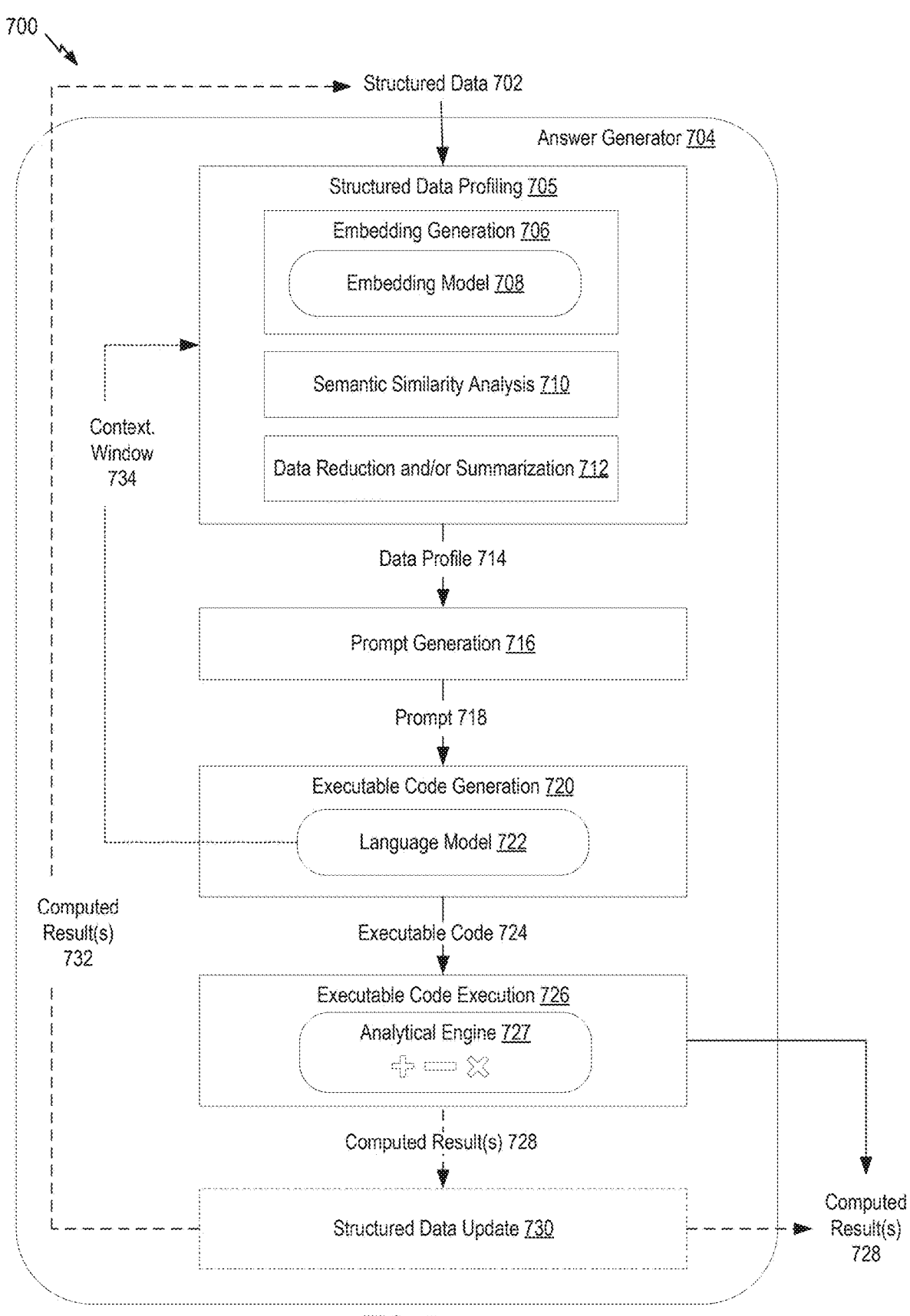
FIG. 7 depicts an example workflow for generating computed result(s) from structured data.

FIG. 7 depicts an example workflow 700 for generating computed result(s) 728 from structured data 702. In certain aspects, structured data 702 is an example of structured data 214 in FIG. 2 and/or structured data 626 in FIG. 6. In certain aspects, computed result(s) 728 are an example of computed result(s) 218 in FIG. 2.

As shown in FIG. 7, an answer generator 704 (e.g., an example of answer generator 216 in FIG. 2) may receive structured data 626 and structured data 702 and perform structured data profiling 705 to create data profile 714. In certain aspects, data profile 714 comprises a subset of structured data 702 (e.g., a reduced-version of the structured data 702). In certain aspects, data profile 714 comprises a summarization of structured data 702. In certain aspects, data profile 714 is sized to a context window 734 of language model 722. The "context window 734 of language model 722 may refer to an amount of text, such as in tokens, that the langue model can consider at any one time to generate a response.

In certain aspects, structured data profiling 705 involves answer generator 704 performing embedding generation 706 using an embedding model 708, semantic similarity analysis 710, and data reduction and/or summarization 712. More specifically, embedding generation 706 involves answer generator 704 generating (1) a query embedding for the query (e.g., such as query 202 in FIG. 2) and (2) a portion embedding for one or more portions of structured data 702 (e.g., generate a first portion embedding for a first portion, generate a second portion embedding for a second portion, etc.). Answer generator 704 may use embedding model 708 to generate these embeddings. Example portions of structured data 702 may include column names, selected unique values, brief column descriptors, and/or the like. Semantic similarity analysis 710 involves answer generator 704 comparing the portion embeddings of the structured data 702 portions to the query embedding to identify portions of structured data 702 that are most relevant to the query's intent. For example, during semantic similarity analysis 710, answer generator 704 may determine a similarity between each portion embedding (e.g., in an embedding space) and the query embedding. A similarity score may be assigned to each portion embedding based on the similarity of the portion embedding to the query embedding. A portion of structured data, associated with a portion embedding that is assigned a highest similarity score, may represent a portion of structured data 702 that is most similar/relevant to the query. A portion of structured data, associated with a portion embedding that is assigned a similarity score that satisfies a similarity threshold (e.g., similarity score>similarity threshold) may be used to generate data profile 714. Similarly, a portion of structured data, associated with a portion embedding that is assigned a similarity score that does not satisfy the similarity threshold (e.g., similarity score<similarity threshold) may not be used to generate data profile 714. Data reduction and/or summarization 712 involves assembling data profile 714 (e.g., a compact, query-aware profile) that based on the portions of structured data that are associated with portion embeddings assigned similarity scores that satisfy the similarity threshold. For example, data profile

714 may be assembled to include portions of structured data 702, such as relevant columns, representative values, and/or lightweight statistics sized to fit within context window 734 of language model 722, thereby enabling efficient and reliable code synthesis in subsequent steps.

In certain aspects, prompt generation 716 involves answer generator 704 generating one or more prompts 718 based on data profile 714 (or updated versions of data profile 714, updated with computed result(s), or "intermediate computed result(s)"). Each prompt 718 may include step-specific instructions for generating a set of executable code (e.g., executable code 724) configured to perform at least one computation in accordance with one or more steps of an analysis sequence, such as an analysis sequence defined in a plan, like plan 206 in FIG. 2. Each prompt 718 may include the data profile 714 (or an updated version of the data profile 714) for the structured data 702 so the executable code 724, generated by the specific prompt 718, operates over the correct (e.g., most relevant) columns, values, and/or scopes of structured data 702.

As an illustrative example, for a query (e.g., query 202 in FIG. 2) requesting gross profit margin for a last quarter, prompt generation 716 may involve answer generator 704 generating three prompts 718. A first prompt may include instructions for generating executable code configured to compute total revenue for the specified period, such as by applying the last-quarter timeframe to the revenue column and returning a single value. A second prompt may include instructions for generating executable code configured to compute a cost of goods sold for the same period, such as by summing the corresponding column under the same timeframe. A third prompt may include instructions for generating executable code configured to compute gross profit and gross margin percentage, such as based on using the two previously computed values (e.g., computed results).

In certain aspects, executable code generation 720 involves answer generator 704 generating executable code 724 based on processing a prompt 718 generated during prompt generation 716. Executable code 724 may include SQL code and/or Python code. For example, language model 722 may be prompted with a prompt 718 to generate executable code 724, and generate executable code 724 based on the prompt 718. The executable code 724 may be configured to perform at least one computation over data profile 714, for structured data 702, in accordance with the step-specific instructions included in the prompt 718. The executable code 724 may be generated with a format suitable for direct execution by an analytical engine 727 and reflects the columns, filters, groupings, and/or measures specified in the prompts so that subsequent execution produces computed result(s) consistent with the scope of the query. In certain aspects, analytical engine comprises an in-process SQL online analytical processing (OLAP) database management system, such as DuckDB®. In certain aspects, executable code generation 720 is performed multiple times to generate multiple sets of executable code 724 (also referred to herein as multiple "code segments") for execution (e.g., such as to perform multiple calculations on data profile 714 and/or updated version(s) of data profile 714).

For the previous example, executable code generation 720 includes generating a first set of executable code that aggregates a "revenue" column in data profile 714 to compute total revenue (e.g., a first computed result 728), generating a second set of executable code that aggregates a "cost_of_goods_sold" column in data profile 714 to compute a total cost of goods sold (e.g., a second computed result 728), and generate a third set of executable code that calculates gross profit and gross margin (e.g., third and fourth computed results 728) from the two prior computed results 728. Each segment is synthesized from its corresponding prompt and is formatted for direct execution by the analytical engine so that the computed outputs align with the requested measures.

In certain aspects, executable code execution 726 involves answer generator 704 executing executable code 724 over data profile 714 and/or updated version(s) of data profile 714 to produce computed result(s) 728. In certain aspects, analytical engine 727 is used to execute the executable code 724. In certain aspects, executable code execution 726 involves answer generator 704 validating the executable code 724 prior to execution. Validation of executable code 724 may confirm adherence of executable code 724 to execution constraints and/or conformance with the referenced columns and filters in the data profile 714 (and/or updated version(s) of data profile 714). Upon successful validation, the analytical engine 727 may run each set of executable code 724 associated with prompt(s) 718, materialize intermediate computed result(s) 728, where applicable, and return final computed result(s) 728 consistent with the analysis sequence (e.g., such as indicated in plan 206 depicted and described above with respect to FIG. 2). The resulting computed result(s) 728 may reflect the scope and/or measures specified for the query. In certain aspects, the computed result(s) 728 may be provided downstream for response formation and/or presentation.

In certain aspects, answer generator 704 may optionally perform structured data update 730. In certain aspects, structured data update 730 involves answer generator 704 appending intermediate computed result(s) to structure data 702, such that an updated data profile 714 is generated from this updated structured data 702. In certain aspects, this update may be performed such that updated data profile 714 reflects newly available fields and preserves references to the computations that produced them. This update enables subsequent prompts 718, associated with subsequent analyses, to reference these intermediate computed result(s) directly, reducing redundant computation and maintaining continuity with the established analysis context. In certain other aspects (although not shown in FIG. 7), structured data update 730 may instead involve updating data profile 714 directly.

For the previous example, executable code execution 726 and structured data update 730 involves (1) executing the first executable code 724, on data profile 714, to produce a first computed result 728, (2) updating data profile 714 with the first computed result 728 to generate a first updated version of data profile 714, (3) executing the second executable code 724, on the first updated version of data profile 714, to produce a second computed result 728, (4) updating the first updated version of data profile 714 with the second computed result 728 to generate a second updated version of data profile 714, and (5) executing the third executable code 724, on the second updated version of data profile 714, to produce a first computed result 728.

Returning to FIG. 2, response generator 220 may generate data-driven output 222 based on at least one of the computed result(s) 218. In certain aspects, the data-driven output 222 comprises one or more of the computed result(s) 218. In certain aspects, the data-driven output 222 comprises a narrative explanation that references at least one of the computed result(s) 218. In certain aspects, the data-driven output 222 comprises a visualization based on at least one of the computed result(s) 218. In certain aspects, response generator 220 generating data-driven output 222 involves response generator 220 generating data-driven output 222 for display via a user interface of a computing device, such as computing device 250.

A user may perform one or more actions based on data-driven output 222. For example, a small business owner may review data-driven output 222 indicating gross margin trends and adjust pricing or inventory strategy accordingly. An accounts team may monitor overdue invoices, indicated in data-driven output 222, and prioritize collections accordingly. A project manager may track vendor spend, indicated in data-driven output 222, and reallocate budgets based on top-spend categories accordingly. An executive may compare revenue, indicated in data-driven output 222, to external benchmarks and set targets for the next quarter accordingly. In each case, system 200 presents computed results and supporting context in a form suitable for decision-making, allowing users to follow up with additional queries, export summaries, and/or initiate workflows directly from the application interface.

Example Data-Driven Output Generated for a Natural Language Query

FIGS. 8A and 8B depict example data-driven output generated for a natural language query "how's my business doing?" (simply referred to herein as the "query"). In certain aspects, the data-driven output may be generated for the natural language query by system 200 depicted and described above with respect to FIG. 2. As shown in FIG. 8A, the system (not shown) analyzes the query to determine intent and relies on a conversation context indication to set the scope to "last year" based on a prior interaction of the user submitting the query with the system. The system identifies a profit and loss dataset as the most suitable dataset to address the query and customizes that dataset to the "last year" timeframe to obtain filtered data. The system then performs computations on the filtered data, including total income, total cost of goods sold, gross profit, total expenses, net operating income, and other income and other expenses. As shown in FIG. 8B, the computed results are presented together with a visualization that plots the relevant measures over the period from January 2024 through December 2024, providing a clear, period-aligned view of the business's performance.

FIGS. 9A and 9B depict example data-driven output generated for a natural language query "what is my debt-to-income ratio?" (simply referred to herein as the "query"). In certain aspects, the data-driven output may be generated for the natural language query by system 200 depicted and described above with respect to FIG. 2. For example, as shown in FIG. 9A, the system (not shown in FIG. 9) analyzes the query and decomposes it into a first sub-query for "total debt" and a second sub-query for "total income." The system then identifies a dataset associated with each sub-query, such as a profit and loss report to obtain total liabilities (e.g., debt) for the first sub-query and the same profit and loss report to obtain total income for the second sub-query. The profit and loss dataset may be filtered to the query's scope by applying the appropriate timeframe and attribute selections, and filtered data may be extracted. The system performs calculations on the filtered data based on the generation and execution of code. The calculations include a total liabilities (e.g., debt) calculation (e.g., that produces a first computed result), a total income calculation (e.g., that produces a second computed result), and a calculation that divides the total debt by the total income to compute a debt-to-income ratio (e.g., a third computed result). As shown in FIG. 9B, the computed results include total liabilities, total income, and the resulting debt-to-income ratio. In this example, each of the computed results, along with a visualization generated to illustrate the ratio for the specific period, are displayed via a user interface.

Example Method for Code Generation and Execution

FIG. 10 depicts an example method 1000 for data-driven code generation and execution. In one aspect, method 1000 can be implemented by the system 200 of FIG. 2 and/or processing system 1100 of FIG. 11.

Method 1000 begins at block 1005 with obtaining: structured data associated with a natural language query; and a plan that defines an analysis sequence for generation of data-driven output that is responsive to the natural language query, wherein the analysis sequence comprises a plurality of steps based on the structured data.

Method 1000 then proceeds to block 1010 with generating, based on the plan, one or more prompts, each respective prompt of the one or more prompts comprising at least: instructions for generating a set of executable code configured to perform the at least one computation in accordance with one or more steps of the plurality of steps; and a data profile for the structured data.

Method 1000 then proceeds to block 1015 with prompting a LM, with each respective prompt, to generate the set of executable code, associated with each respective prompt, based on at least the data profile.

Method 1000 then proceeds to block 1020 with executing the set of executable code associated with each respective prompt to produce one or more computed results.

Method 1000 then proceeds to block 1025 with generating the data-driven output based on at least one computed result of the one or more computed results.

In some aspects, the data profile included in each respective prompt comprises: a subset of the structured data; or a summarization of the structured data; and a size of the data profile included in each respective prompt is based on a context window of the language model.

In some aspects, method 1000 further includes generating, by an embedding model, a query embedding for the natural language query.

In some aspects, method 1000 further includes generating, by the embedding model, a plurality of portion embeddings for a plurality of portions of the structured data.

In some aspects, method 1000 further includes determining a similarity score for each respective portion embedding of the plurality of portion embeddings based on a similarity between the query embedding and each respective portion embedding.

In some aspects, method 1000 further includes identifying the similarity score determined for a first subset of the plurality of portion embeddings, associated with a first subset of the plurality of portions of the structured data, satisfies a similarity threshold.

In some aspects, method 1000 further includes generating the data profile for each respective prompt based on the first subset of the plurality of portions of the structured data.

In some aspects, block 1020 includes executing, by an analytical engine, the set of executable code, associated with each respective prompt.

In some aspects, blocks 1015-1020 include: for a first prompt of the one or more prompts: executing the set of executable code associated with the first prompt to produce a first computed result of the one or more computed results; and updating the data profile to include the first computed result; for each respective remaining prompt of the one or more prompts and in accordance with an execution order associated with the analysis sequence of the plan: executing the set of executable code associated with the respective remaining prompt to produce a second computed result of the one or more computed results; and updating the data profile to include the second computed result.

In some aspects, the first prompt comprises the instructions for generating the set of executable code configured to perform the at least one computation in accordance with a first-in-time computational step of the plurality of steps.

In some aspects, the set of executable code associated with each respective prompt comprises at least one of: SQL code; or Python code.

In some aspects, method 1000 further includes displaying, via a user interface of a computing device, the data-driven output.

In some aspects, block 1025 includes generating a narrative explanation that references the at least one computed result.

In some aspects, block 1025 includes generating a visualization based on the at least one computed result.

In some aspects, the natural language query relates to a business insight comprising at least one of a financial measure, a performance assessment, or a decision support output; and the at least one computed result comprises information associated with the business insight.

By leveraging method 1000 for code generation and execution, significant technical advantages may be achieved. For example, method 1000 offers a solution for efficiently and accurately converting a plan and structured data into computed results by orchestrating a sequence of prompt formation, language-model-assisted code synthesis, and deterministic analytical execution. This approach enables the system to translate step-specific instructions and a data profile into executable analysis code that is validated and run over the prepared data, while preserving alignment with the defined analysis sequence. As a result, users can obtain dependable answers to their queries without manual scripting and/or ad hoc spreadsheet operations, reducing effort and minimizing errors introduced by fragmented workflows. Accordingly, the performance and usability of in-application data analysis may be enhanced, supporting faster computation, reproducible outcomes, and clear traceability from the generated code to the computed results presented in the final output.

Note that FIG. 10 is just one example of a method, and other methods including fewer, additional, or alternative operations are possible consistent with this disclosure.

Example Processing System for Code Generation and Execution

Figure 11:
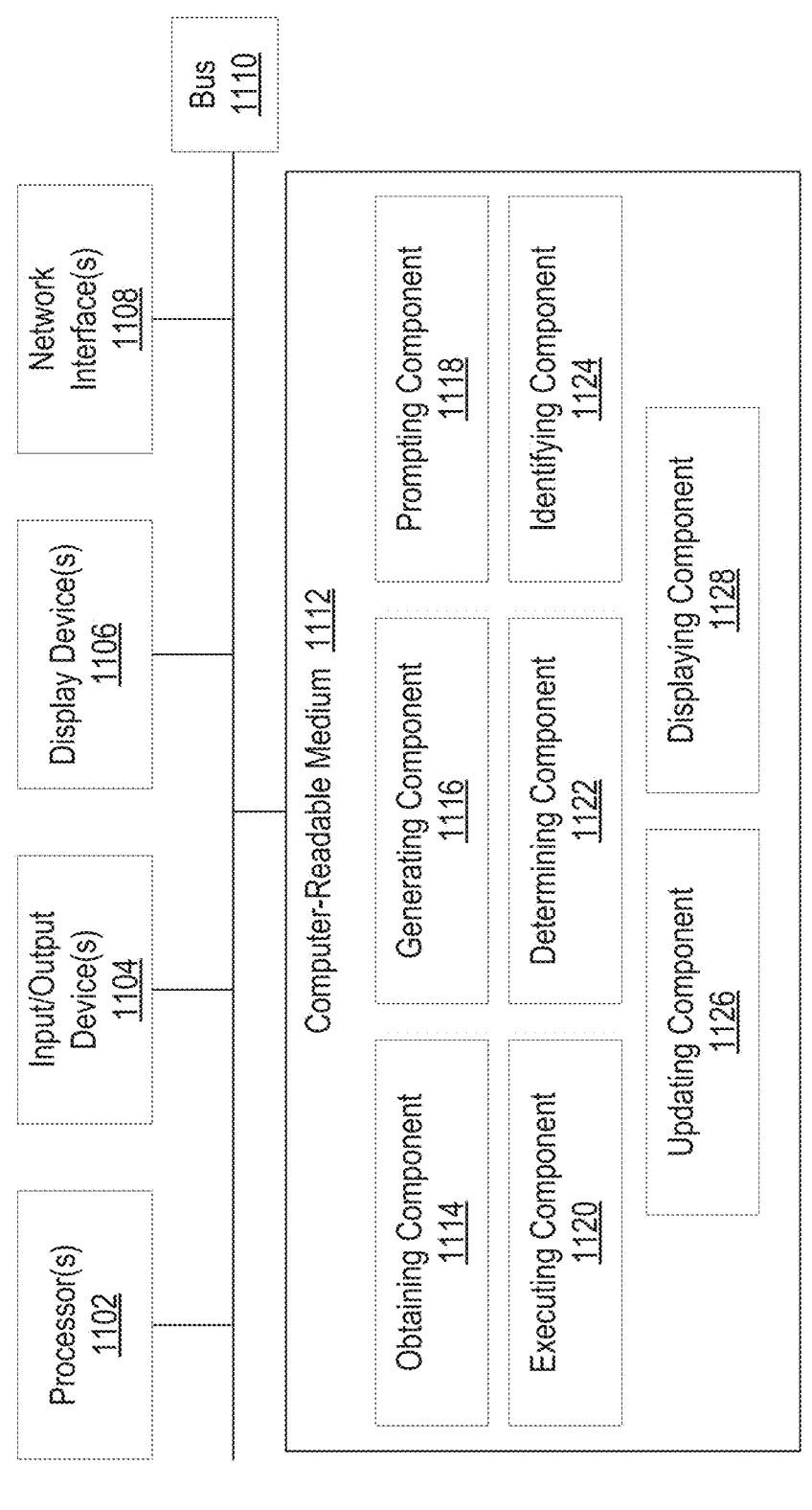
FIG. 11 depicts an example processing system with which aspects of the present disclosure can be performed.

FIG. 11 depicts an example processing system 1100 configured to perform various aspects described herein, including, for example, method 1000 as described above with respect to FIG. 10.

Processing system 1100 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1100 includes one or more processors 1102, one or more input/output devices 1104, one or more display devices 1106, one or more network interfaces 1108 through which processing system 1100 is connected to one or more networks (e.g., a local network, an intranet, the Internet, or any other group of processing systems communicatively connected to each other), and computer-readable medium 1112. In the depicted example, the aforementioned components are coupled by a bus 1110, which may generally be configured for data exchange amongst the components. Bus 1110 may be representative of multiple buses, while only one is depicted for simplicity.

Processor(s) 1102 are generally configured to retrieve and execute instructions stored in one or more memories, including local memories like computer-readable medium 1112, as well as remote memories and data stores. Similarly, processor(s) 1102 are configured to store application data residing in local memories like the computer-readable medium 1112, as well as remote memories and data stores. More generally, bus 1110 is configured to transmit programming instructions and application data among the processor(s) 1102, display device(s) 1106, network interface(s) 1108, and/or computer-readable medium 1112. In certain embodiments, processor(s) 1102 are representative of one or more central processing units (CPUs), graphics processing unit (GPUs), tensor processing unit (TPUs), accelerators, and other processing devices.

Input/output device(s) 1104 may include any device, mechanism, system, interactive display, and/or various other hardware and software components for communicating information between processing system 1100 and a user of processing system 1100. For example, input/output device(s) 1104 may include input hardware, such as a keyboard, touch screen, button, microphone, speaker, and/or other device for receiving inputs from the user and sending outputs to the user.

Display device(s) 1106 may generally include any sort of device configured to display data, information, graphics, user interface elements, and the like to a user. For example, display device(s) 1106 may include internal and external displays such as an internal display of a tablet computer or an external display for a server computer or a projector. Display device(s) 1106 may further include displays for devices, such as augmented, virtual, and/or extended reality devices. In various embodiments, display device(s) 1106 may be configured to display a graphical user interface.

Network interface(s) 1108 provide processing system 1100 with access to external networks and thereby to external processing systems. Network interface(s) 1108 can generally be any hardware and/or software capable of transmitting and/or receiving data via a wired or wireless network connection. Accordingly, network interface(s) 1108 can include a communication transceiver for sending and/or receiving any wired and/or wireless communication.

Computer-readable medium 1112 may be a volatile memory, such as a random access memory (RAM), or a nonvolatile memory, such as nonvolatile random access memory (NVRAM), or the like. In this example, computer-readable medium 1112 includes obtaining component 1114, generating component 1116, prompting component 1118, executing component 1120, determining component 1122, identifying component 1124, updating component 1126, and displaying component 1128. Processing of the components 1114-1128 may enable and cause the processing system 1100 to perform the method 1000 described with respect to FIG. 10, or any aspect related to it.

In certain embodiments, obtaining component 1114 is configured to obtain: structured data associated with a natural language query; and a plan that defines an analysis sequence for generation of data-driven output that is responsive to the natural language query, wherein the analysis sequence comprises a plurality of steps based on the structured data, as described in FIG. 10 with reference to block 1005. In certain embodiments, generating component 1116 is configured to generate, based on the plan, one or more prompts, each respective prompt of the one or more prompts comprising at least: instructions for generating a set of executable code configured to perform at least one computation in accordance with one or more steps of the plurality of steps; and a data profile for the structured data, as described in FIG. 10 with reference to block 1010. In certain embodiments, prompting component 1118 is configured to prompt a LM, with each respective prompt, to generate the set of executable code, associated with each respective prompt, based on at least the data profile, as described in FIG. 10 with reference to block 1015. In certain embodiments, executing component 1120 is configured to execute the set of executable code associated with each respective prompt to produce one or more computed results, as described in FIG. 10 with reference to block 1020. In certain embodiments, generating component 1116 is configured to generate data-driven output based on at least one computed result of the one or more computed results, as described in FIG. 10 with reference to block 1025.

Note that FIG. 11 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method of data-driven code generation and execution, comprising: obtaining: structured data associated with a natural language query; and a plan that defines an analysis sequence for generation of data-driven output that is responsive to the natural language query, wherein the analysis sequence comprises a plurality of steps based on the structured data; generating, based on the plan, one or more prompts, each respective prompt of the one or more prompts comprising at least: instructions for generating a set of executable code configured to perform at least one computation in accordance with one or more steps of the plurality of steps; and a data profile for the structured data; prompting a LM, with each respective prompt, to generate the set of executable code, associated with each respective prompt, based on at least the data profile; executing the set of executable code associated with each respective prompt to produce one or more computed results; and generating the data-driven output based on at least one computed result of the one or more computed results.

Clause 2: The method of Clause 1, wherein: the data profile included in each respective prompt comprises: a subset of the structured data; or a summarization of the structured data; and a size of the data profile included in each respective prompt is based on a context window of the language model.

Clause 3: The method of any one of Clauses 1-2, further comprising: generating, by an embedding model, a query embedding for the natural language query; generating, by the embedding model, a plurality of portion embeddings for a plurality of portions of the structured data; determining a similarity score for each respective portion embedding of the plurality of portion embeddings based on a similarity between the query embedding and each respective portion embedding; identifying the similarity score determined for a first subset of the plurality of portion embeddings, associated with a first subset of the plurality of portions of the structured data, satisfies a similarity threshold; and generating the data profile for each respective prompt based on the first subset of the plurality of portions of the structured data.

Clause 4: The method of any one of Clauses 1-3, wherein executing the set of executable code, associated with each respective prompt, comprises executing, by an analytical engine, the set of executable code, associated with each respective prompt.

Clause 5: The method of any one of Clauses 1-4, wherein prompting the LM, with each respective prompt, to generate the set of executable code, and executing the set of executable code associated with each respective prompt comprises: for a first prompt of the one or more prompts: executing the set of executable code associated with the first prompt to produce a first computed result of the one or more computed results; and updating the data profile to include the first computed result; for each respective remaining prompt of the one or more prompts and in accordance with an execution order associated with the analysis sequence of the plan: executing the set of executable code associated with the respective remaining prompt to produce a second computed result of the one or more computed results; and updating the data profile to include the second computed result.

Clause 6: The method of Clause 5, wherein the first prompt comprises the instructions for generating the set of executable code configured to perform the at least one computation in accordance with a first-in-time computational step of the plurality of steps.

Clause 7: The method of any one of Clauses 1-6, wherein the set of executable code associated with each respective prompt comprises at least one of: SQL code; or Python code.

Clause 8: The method of any one of Clauses 1-7, further comprising displaying, via a user interface of a computing device, the data-driven output.

Clause 9: The method of Clause 8, wherein generating the data-driven output comprises generating a narrative explanation that references the at least one computed result.

Clause 10: The method of Clause 8, wherein generating the data-driven output comprises generating a visualization based on the at least one computed result.

Clause 11: The method of any one of Clauses 1-10, wherein: the natural language query relates to a business insight comprising at least one of a financial measure, a performance assessment, or a decision support output; and the at least one computed result comprises information associated with the business insight.

Clause 12: A processing system, comprising: memory comprising computer-executable instructions; and one or more processors configured to execute the computer-executable instructions and cause the processing system to perform a method in accordance with any one of Clauses 1-11.

Clause 13: A processing system, comprising means for performing a method in accordance with any one of Clauses 1-11.

Clause 14: A non-transitory computer-readable medium storing program code for causing a processing system to perform the steps of any one of Clauses 1-11.

Clause 15: A computer program product embodied on a computer-readable storage medium comprising code for performing a method in accordance with any one of Clauses 1-11.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f)

unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of data-driven code generation and execution, comprising:
  obtaining:
    structured data associated with a natural language query; and
    a plan that defines an analysis sequence for generation of data-driven output that is responsive to the natural language query, wherein the analysis sequence comprises a plurality of steps based on the structured data;
  generating, based on the plan, one or more prompts, each respective prompt of the one or more prompts comprising at least:
    instructions for generating a set of executable code configured to perform at least one computation in accordance with one or more steps of the plurality of steps; and
    a data profile for the structured data;
  prompting a language model (LM), with each respective prompt, to generate the set of executable code, associated with each respective prompt, based on at least the data profile;
  executing the set of executable code associated with each respective prompt to produce one or more computed results; and
  generating the data-driven output based on at least one computed result of the one or more computed results.

2. The method of claim 1, wherein:
  the data profile included in each respective prompt comprises:
    a subset of the structured data; or
    a summarization of the structured data; and
  a size of the data profile included in each respective prompt is based on a context window of the language model.

3. The method of claim 1, further comprising:
  generating, by an embedding model, a query embedding for the natural language query;
  generating, by the embedding model, a plurality of portion embeddings for a plurality of portions of the structured data;
  determining a similarity score for each respective portion embedding of the plurality of portion embeddings based on a similarity between the query embedding and each respective portion embedding;
  identifying the similarity score determined for a first subset of the plurality of portion embeddings, associated with a first subset of the plurality of portions of the structured data, satisfies a similarity threshold; and
  generating the data profile for each respective prompt based on the first subset of the plurality of portions of the structured data.

4. The method of claim 1, wherein executing the set of executable code, associated with each respective prompt, comprises executing, by an analytical engine, the set of executable code, associated with each respective prompt.

5. The method of claim 1, wherein prompting the LM, with each respective prompt, to generate the set of executable code, and executing the set of executable code associated with each respective prompt comprises:
  for a first prompt of the one or more prompts:
    executing the set of executable code associated with the first prompt to produce a first computed result of the one or more computed results; and
    updating the data profile to include the first computed result;
  for each respective remaining prompt of the one or more prompts and in accordance with an execution order associated with the analysis sequence of the plan:
    executing the set of executable code associated with the respective remaining prompt to produce a second computed result of the one or more computed results; and
    updating the data profile to include the second computed result.

6. The method of claim 5, wherein the first prompt comprises the instructions for generating the set of executable code configured to perform the at least one computation in accordance with a first-in-time computational step of the plurality of steps.

7. The method of claim 1, wherein the set of executable code associated with each respective prompt comprises at least one of:
  structured query language (SQL) code; or
  Python code.

8. The method of claim 1, further comprising displaying, via a user interface of a computing device, the data-driven output.

9. The method of claim 8, wherein generating the data-driven output comprises generating a narrative explanation that references the at least one computed result.

10. The method of claim 8, wherein generating the data-driven output comprises generating a visualization based on the at least one computed result.

11. The method of claim 1, wherein:
  the natural language query relates to a business insight comprising at least one of a financial measure, a performance assessment, or a decision support output; and
  the at least one computed result comprises information associated with the business insight.

12. A processing system, comprising: memory comprising computer-executable instructions; and one or more processors configured to execute the computer-executable instructions and cause the processing system to:
  obtain:
    structured data associated with a natural language query; and
    a plan that defines an analysis sequence for generation of data-driven output that is responsive to the natural language query, wherein the analysis sequence comprises a plurality of steps based on the structured data;
  generate, based on the plan, one or more prompts, each respective prompt of the one or more prompts comprising at least:
    instructions for generating a set of executable code configured to perform at least one computation in accordance with one or more steps of the plurality of
steps; and a data profile for the structured data;

prompt a language model (LM), with each respective
prompt, to generate the set of executable code, associated with each respective prompt, based on at least the
data profile;

execute the set of executable code associated with each
respective prompt to produce one or more computed
results; and generate data-driven output based on at least one computed result of the one or more computed results.

13. The processing system of claim 12, wherein:

the data profile included in each respective prompt comprises:

a subset of the structured data; or a summarization of the structured data; and a size of the data profile included in each respective
prompt is based on a context window of the language
model.

14. The processing system of claim 12, wherein the one
or more processors are configured to execute the computer-executable instructions and cause the processing system to:

generate, by an embedding model, a query embedding for
the natural language query;

generate, by the embedding model, a plurality of portion
embeddings for a plurality of portions of the structured
data;

determine a similarity score for each respective portion
embedding of the plurality of portion embeddings
based on a similarity between the query embedding and
each respective portion embedding;

identify the similarity score determined for a first subset
of the plurality of portion embeddings, associated with
a first subset of the plurality of portions of the structured data, satisfies a similarity threshold; and generate the data profile for each respective prompt based
on the first subset of the plurality of portions of the
structured data.

15. The processing system of claim 12, wherein to cause
the processing system to execute the set of executable code,
associated with each respective prompt, the one or more
processors are configured to execute the computer-executable instructions and cause the processing system to execute,
by an analytical engine, the set of executable code, associated with each respective prompt.

16. The processing system of claim 12, wherein to cause
the processing system to prompt the LM, with each respective prompt, to generate the set of executable code, and to
cause the processing system to execute the set of executable
code associated with each respective prompt, the one or
more processors are configured to execute the computer-executable instructions and cause the processing system to:

for a first prompt of the one or more prompts:

execute the set of executable code associated with the
first prompt to produce a first computed result of the
one or more computed results; and update the data profile to include the first computed
result;

for each respective remaining prompt of the one or more
prompts and in accordance with an execution order
associated with the analysis sequence of the plan:

execute the set of executable code associated with the
respective remaining prompt to produce a second
computed result of the one or more computed results;
and update the data profile to include the second computed
result.

17. The processing system of claim 16, wherein the first
prompt comprises the instructions for generating the set of
executable code configured to perform the at least one
computation in accordance with a first-in-time computational step of the plurality of steps.

18. The processing system of claim 12, wherein the set of
executable code associated with each respective prompt
comprises at least one of:

structured query language (SQL) code; or

Python code.

19. The processing system of claim 12, wherein the one
or more processors are configured to execute the computer-executable instructions and cause the processing system to
display, via a user interface of a computing device, the
data-driven output.

20. The processing system of claim 19, wherein to cause
the processing system to generate the data-driven output, the
one or more processors are configured to execute the computer-executable instructions and cause the processing system to generate a narrative explanation that references the at
least one computed result.

* * * * *